US012374762B2

(12) United States Patent
Lee et al.

(10) Patent No.: US 12,374,762 B2
(45) Date of Patent: Jul. 29, 2025

(54) CYLINDRICAL SECONDARY BATTERY COMPRISING IMPROVED CURRENT COLLECTOR PLATE, BATTERY PACK AND VEHICLE INCLUDING THE SAME

(71) Applicant: LG ENERGY SOLUTION, LTD., Seoul (KR)

(72) Inventors: Byoung-Gu Lee, Daejeon (KR); Duk-Hyun Ryu, Daejeon (KR); Kwan-Hee Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/271,796

(22) PCT Filed: Oct. 28, 2022

(86) PCT No.: PCT/KR2022/016740
§ 371 (c)(1),
(2) Date: Jul. 11, 2023

(87) PCT Pub. No.: WO2023/075520
PCT Pub. Date: May 4, 2023

(65) Prior Publication Data
US 2024/0313364 A1 Sep. 19, 2024

(30) Foreign Application Priority Data
Oct. 29, 2021 (KR) .................. 10-2021-0147346
Dec. 24, 2021 (KR) .................. 10-2021-0187847

(51) Int. Cl.
*H01M 50/533* (2021.01)
*H01M 10/0525* (2010.01)
(Continued)

(52) U.S. Cl.
CPC ..... *H01M 50/533* (2021.01); *H01M 10/0525* (2013.01); *H01M 10/0587* (2013.01);
(Continued)

(58) Field of Classification Search
CPC ............. H01M 50/533; H01M 50/536; H01M 10/0587
See application file for complete search history.

(56) References Cited

U.S. PATENT DOCUMENTS 9,159,976 B2  10/2015  Rigobert et al.
9,496,539 B2  11/2016  Tyler et al.
(Continued)

FOREIGN PATENT DOCUMENTS

JP  2000-268846 A  9/2000
JP  2003-288881 A  10/2003
(Continued)

OTHER PUBLICATIONS

WO2020045375 English translation. Wipo. Sep. 9, 2021. (Year: 2021).*

(Continued)

*Primary Examiner* — Christopher P Domone
(74) *Attorney, Agent, or Firm* — Birch, Stewart, Kolasch & Birch, LLP

(57) ABSTRACT

A cylindrical secondary battery includes an electrode assembly having a positive electrode, a negative electrode, and a separator located between the positive electrode and the negative electrode, the positive electrode, the negative electrode, and the separator being wound in a winding direction, the positive electrode including a positive electrode uncoated portion exposed beyond the separator, the negative electrode including a negative electrode uncoated portion exposed beyond the separator, a positive electrode current collector plate coupled to the positive electrode uncoated
(Continued)

portion by one or more positive electrode welding portions, and a negative electrode current collector plate coupled to the negative electrode uncoated portion by one or more negative electrode welding portions. A coupling area between the positive electrode uncoated portion and the positive electrode current collector plate is smaller than a coupling area between the negative electrode uncoated portion and the negative electrode current collector plate.

35 Claims, 18 Drawing Sheets

(51) Int. Cl.
  *H01M 10/0587* (2010.01)
  *H01M 50/107* (2021.01)
  *H01M 50/536* (2021.01)
  *H01M 50/545* (2021.01)
  *H01M 50/559* (2021.01)

(52) U.S. Cl.
  CPC ....... *H01M 50/107* (2021.01); *H01M 50/536* (2021.01); *H01M 50/545* (2021.01); *H01M 50/559* (2021.01); *H01M 2220/20* (2013.01)

(56) References Cited

U.S. PATENT DOCUMENTS

| | | |
|---|---|---|
| 2005/0260489 A1 | 11/2005 | Kim |
| 2005/0277020 A1 | 12/2005 | Cheon et al. |
| 2008/0166630 A1 | 7/2008 | Okabe et al. |
| 2009/0087733 A1 | 4/2009 | Yoon et al. |
| 2010/0104945 A1 | 4/2010 | Kozuki et al. |
| 2014/0087245 A1* | 3/2014 | Lee ................ H01M 50/55 228/1.1 |
| 2016/0343518 A1 | 11/2016 | Sakurai et al. |
| 2017/0372848 A1 | 12/2017 | Yoon et al. |
| 2022/0131216 A1 | 4/2022 | Park et al. |

FOREIGN PATENT DOCUMENTS

| | | |
|---|---|---|
| JP | 2007-335156 A | 12/2007 |
| JP | 2010-282846 A | 12/2010 |
| JP | 4977951 B2 | 7/2012 |
| JP | 5796497 B2 | 10/2015 |
| JP | 2018-507541 A | 3/2018 |
| JP | 2019-145478 A | 8/2019 |
| KR | 10-2005-0106539 A | 11/2005 |
| KR | 10-0599793 B1 | 7/2006 |
| KR | 10-2008-0102854 A | 11/2008 |
| KR | 10-2009-0034124 A | 4/2009 |
| KR | 10-2009-0108633 A | 10/2009 |
| KR | 10-2020-0094453 A | 8/2020 |
| WO | WO2020/045375 A1 | 3/2020 |

OTHER PUBLICATIONS

Written Opinion of the International Searching Authority for PCT/KR2022/016740 (PCT/ISA/237) mailed on Mar. 2, 2023.
Extended European Search Report for European Application No. 22887715.5, dated Dec. 12, 2024.
International Search Report for PCT/KR2022/016740 (PCT/ISA/210) mailed on Mar. 2, 2023.
Ko, "What is Tesla's ambitious "Tabless Battery" technology?", Dong—A Science, https://www.dongascience.com/print.php?idx=40048, Sep. 23, 2020, 6 pages total, with English translation.

\* cited by examiner

CYLINDRICAL SECONDARY BATTERY COMPRISING IMPROVED CURRENT COLLECTOR PLATE, BATTERY PACK AND VEHICLE INCLUDING THE SAME

TECHNICAL FIELD

The present disclosure relates to a secondary battery, and more particularly, to a current collector plate and a cylindrical secondary battery including the same. The present disclosure also relates to a battery pack and a vehicle including the cylindrical secondary battery. The present application claims priority to Korean Patent Application No. 10-2021-0147346 filed on Oct. 29, 2021 and Korean Patent Application No. 10-2021-0187847 filed on Dec. 24, 2021 in the Republic of Korea, the disclosure of which is incorporated herein by reference.

BACKGROUND ART

As technology development and demand for mobile devices and electric vehicles increase, the demand for secondary batteries as an energy source is rapidly increasing. The currently widely used secondary battery is a lithium-ion battery, and cylindrical, prismatic, and pouch-type secondary batteries are known. The cylindrical secondary battery is manufactured by interposing a separator, which is an insulator, between a positive electrode plate and a negative electrode plate, winding the separator, the positive electrode plate and the negative electrode plate to form a jelly-roll type electrode assembly, and inserting the electrode assembly into a battery can. Each electrode plate contains an active material layer coated on the current collector.

In a lithium secondary battery, the part that has the greatest influence on the charge/discharge characteristics such as capacity and cycle life is the positive electrode and the negative electrode where the electrochemical reaction takes place. In particular, the charging and discharging characteristics are affected by the reaction rate of the positive electrode and the negative electrode in the process of lithium ions ($Li^+$) moving through the electrolyte solution by the redox reaction at the electrode. Therefore, when a kinetic balance in which the reaction rate between the positive electrode and the negative electrode is balanced is secured, rapid charging may proceed as desired and cycle characteristics are improved. Therefore, it is necessary to secure a kinetic balance between the positive electrode and the negative electrode in order to facilitate rapid charging and improve the cycle characteristics of the battery.

The kinetic balance may be obtained by making the movement speed of lithium ions at the positive electrode and the negative electrode similar. The movement speed of lithium ions mainly depends on the resistance due to the active material layer coated on the electrode plate. This resistance means the resistance that disturbs the charge transfer of lithium ions inside and on the surface of active material particles. The resistance may vary depending on the type of material constituting the active material layer of the electrode plate, such as an active material, a binder, and a conductive material, and may also vary depending on the distribution of the binder and the conductive material on the surface of the active material particle.

In general, in the existing art, the movement speed of lithium ions is controlled by adjusting the so-called chemistry balance, which controls the composition of the active material layer coated on the electrode plate. However, there is a problem that the controllable range of the movement speed of lithium ions is very narrow only by applying such a method of adjusting the chemistry balance. This is because the composition range of the active material layer useable in the actual lithium secondary battery is set to some extent. If the movement speed of lithium ions is to be controlled within the limit of the process realization capability due to the composition of the active material layer, only adjustment in a relatively minor range is possible. Therefore, there is a need to develop a technology capable of controlling the movement speed of lithium ions with a more meaningful width than controlling the movement speed of lithium ions through adjustment of the chemistry balance.

On the other hand, in the related art, a strip-shaped current collector tab is connected to an uncoated portion, which is an area on which an active material layer is not coated, in an electrode plate, and the current collector tab is used to electrically connect the electrode assembly and an externally exposed electrode terminal. For reference, the positive electrode terminal is a cap plate of a sealing body that seals the opening of the battery can, and the negative electrode terminal is the battery can. However, according to the conventional cylindrical secondary battery having such a structure, current is concentrated in the current collector tab, so there are problems in that resistance is large, heat is generated, and current collection efficiency is not good.

For a small cylindrical secondary battery with a form factor of 18650 or 21700, resistance and heat are not a major issue. However, when the form factor is increased to apply the cylindrical secondary battery to an electric vehicle, a problem that the cylindrical secondary battery is ignited while generating a lot of heat around the current collector tab may occur during the rapid charging process. In order to solve this problem, a positive electrode uncoated portion and a negative electrode uncoated portion are designed to be positioned at the top and bottom of the jelly-roll type electrode assembly, respectively, and the current collector plate is directly welded to the uncoated portion to improve the current collection efficiency. A cylindrical secondary battery having a structure with improved current collection efficiency (so-called tab-less cylindrical secondary battery) may be used.

In the tab-less cylindrical secondary battery, since the welding region of the uncoated portion and the current collector plate constitutes a current path, the current collector plate is a very important component to be managed. The current collector plate needs to maximize the contact area with the uncoated portion as much as possible, thereby minimizing the resistance generated at the connection part between components.

However, in the prior art, since the focus has been on minimizing the resistance, the individual characteristics of the positive electrode current collector plate welding to the positive electrode uncoated portion and the negative electrode current collector plate welding to the negative electrode uncoated portion have been not considered at all, and they have been applied as being vaguely identical or similar to each other, so there is a limit to the performance of a secondary battery that can be implemented.

DISCLOSURE

Technical Problem

An object of the present disclosure is to control the movement speed of lithium ions to a greater extent compared to the technology for controlling the movement speed of lithium ions by adjusting the chemistry balance of a positive electrode and a negative electrode as described above.

Another object of the present disclosure is to improve the performance of a cylindrical secondary battery by improving a positive electrode current collector plate and a negative electrode current collector plate in a tab-less cylindrical secondary battery.

Accordingly, the problem to be solved by the present disclosure is to provide a cylindrical secondary battery including an improved current collector plate.

Another problem to be solved by the present disclosure is to provide a battery pack and a vehicle including such a secondary battery.

The objects to be solved by the present disclosure are not limited to the above objects, and other objects not mentioned are clearly understood by those of ordinary skill in the art to which the present disclosure belongs from the following disclosure.

Technical Solution

The inventors have reached the present disclosure by finding that it is possible not only to secure the kinetic balance between a positive electrode and a negative electrode, but also to improve the energy density and strengthen the coupling force between components by improving a positive electrode current collector plate and a negative electrode current collector plate of a cylindrical secondary battery.

A cylindrical secondary battery according to the present disclosure to solve the above object comprises an electrode assembly having a positive electrode having a sheet shape, a negative electrode having a sheet shape, and a separator located between the positive electrode and the negative electrode, the positive electrode, the negative electrode, and the separator being wound in a winding direction, the positive electrode including a positive electrode uncoated portion exposed beyond the separator at a long side end, the negative electrode including a negative electrode uncoated portion exposed beyond the separator at a long side end; a positive electrode current collector plate coupled to the positive electrode uncoated portion by one or more positive electrode welding portions; and a negative electrode current collector plate coupled to the negative electrode uncoated portion by one or more negative electrode welding portions, wherein a coupling area between the positive electrode uncoated portion and the positive electrode current collector plate is smaller than a coupling area between the negative electrode uncoated portion and the negative electrode current collector plate.

In an aspect, a number of the negative electrode welding portions may be greater than a number of the positive electrode welding portions.

At this time, the one or more positive electrode welding portions and the one or more negative electrode welding portion may extend along a radial direction of the electrode assembly.

In another aspect, the positive electrode current collector plate may cover a top of the electrode assembly, and the negative electrode current collector plate may cover a bottom of the electrode assembly.

Here, the positive electrode current collector plate may include one or more strips extending along a radial direction of the electrode assembly from a center of the positive electrode current collector plate, the one or more positive electrode welding portions may be located on the one or more strips of the positive electrode current collector plate, the negative electrode current collector plate may include one or more strips extending along the radial direction of the electrode assembly from a center of the negative electrode current collector plate, and the one or more negative electrode welding portions may be located on the one or more strips of the negative electrode current collector plate.

In another aspect, the positive electrode current collector plate may include two or more strips arranged at equal intervals, and the negative electrode current collector plate may include two or more strips arranged at equal intervals.

In another aspect, the number of strips of the positive electrode current collector plate may be smaller than the number of strips of the negative electrode current collector plate. For example, when the number of strips of the negative electrode current collector plate is M, the number of strips of the positive electrode current collector plate may be 1 to M−1 (M is a natural number equal to or greater than 2). For example, the number of strips of the positive electrode current collector plate may be three, and the number of strips of the negative electrode current collector plate may be four.

The ratio (S1/S2) of the coupling area S1 between the positive electrode uncoated portion and the positive electrode current collector plate and the coupling area S2 between the negative electrode uncoated portion and the negative electrode current collector plate may be in the range of 1/M to (M−1)/M (M is a natural number greater than or equal to 2).

As another example, the number of the positive electrode welding portions may be smaller than the number of the negative electrode welding portions.

As another example, the number of the positive electrode welding portions may be equal to the number of the negative electrode welding portions, and an area of one positive electrode welding portion of the one or more positive electrode welding portions may be smaller than an area of one negative electrode welding portion of the one or more negative electrode welding portions.

The positive electrode current collector plate and the negative electrode current collector plate may have the same outline shape as a top and bottom of the electrode assembly, respectively.

In an embodiment, the cylindrical secondary battery may further comprise a battery can configured to accommodate the electrode assembly therein, the battery can may include an open portion and a partially closed portion opposite the open portion, the battery can may be electrically connected to the negative electrode uncoated portion; a cap plate configured to seal the open portion of the battery can; and a rivet terminal at a center of the partially closed portion, the rivet being electrically connected to the positive electrode uncoated portion.

Preferably, the cap plate may not be connected to the electrode assembly so as to have no polarity.

In an embodiment, the positive electrode current collector plate may include a rim portion; one or more positive electrode tab coupling portions configured to extend inward from the rim portion, the one or more positive electrode tab coupling portions being coupled to the positive electrode uncoated portion by the one or more positive electrode welding portions; and a terminal coupling portion spaced apart from the one or more positive electrode tab coupling portions, and the rivet terminal may be coupled to the terminal coupling portion.

Preferably, the cylindrical secondary battery may further include an insulator interposed between the closed portion and the positive electrode current collector plate, and the rivet terminal may be coupled with the terminal coupling portion through the insulator.

In an aspect, the rim portion may define a partially empty space.

Preferably, the one or more positive electrode tab coupling portions and the terminal coupling portion may be electrically connected by the rim portion.

In addition, the terminal coupling portion may be located in a center portion of an inner space of the rim portion.

Preferably, the one or more positive electrode tab portions may include a plurality of the positive electrode tab coupling portions.

In this case, the plurality of positive electrode tab coupling portions may be arranged at equal intervals along a circumferential direction of the rim.

Moreover, each of the plurality of positive electrode tab coupling portions may have a same extended length.

Furthermore, the terminal coupling portion may be disposed to be surrounded by the plurality of positive electrode tab coupling portions.

In an embodiment, the electrode assembly may include a cavity in a winding center portion thereof, and the terminal coupling portion is disposed at a location corresponding to the cavity.

Preferably, at least a partial area of the positive electrode uncoated portion may be divided into a plurality of segments, and the plurality of segments may be bent along a radial direction of the electrode assembly.

Preferably, the plurality of segments may be overlapped in multiple layers along the radial direction of the electrode assembly.

In an aspect, the positive electrode current collector plate may include a rim portion; a positive electrode tab coupling portion extending inward from the rim portion and coupled with the positive electrode uncoated portion by the positive electrode welding portion; and a terminal coupling portion located to be spaced apart from the positive electrode tab coupling portion, and the positive electrode tab coupling portion may be coupled to an area in which the plurality of segments are overlapped in multiple layers.

In an embodiment, the battery can may include a beading part at an end adjacent to the open portion, and the negative electrode current collector plate may include one or more negative electrode tab coupling portions coupled to the negative electrode uncoated portion by the one or more negative electrode welding portions, and one or more can coupling portions electrically coupled to the beading part.

The one or more can coupling portions may extend from the one or more negative electrode tab coupling portions.

As another example, the one or more negative electrode tab coupling portions and the one or more can coupling portions may be indirectly connected by a center portion of the negative electrode current collector plate and may not be directly connected to each other.

Each of the negative electrode tab coupling portions may have at least one injection hole.

In another aspect, the negative electrode current collector plate may include a circular negative electrode current collector plate hole in a center portion of the negative electrode current collector plate.

The electrode assembly may include a cavity in a winding center portion thereof, and a diameter of the negative electrode current collector plate hole may be equal to or greater than a diameter of the cavity.

Preferably, the negative electrode current collector plate may have one or more leg structures, each leg structures may have one of the one or more negative electrode tab coupling portions and one of the one or more can coupling portions connected to each other, each leg structure may extend along a radial direction of the electrode assembly.

The one or more leg structures may include a plurality of the leg structures.

Preferably, the one or more can coupling portions may be a single can coupling portion having a continuous ring shape.

In an embodiment of the present disclosure, at least a partial area of the negative electrode uncoated portion may be divided into a plurality of segments, and the plurality of segments may be bent along a radial direction of the electrode assembly.

Preferably, the plurality of segments may be overlapped in multiple layers along the radial direction of the electrode assembly.

Preferably, the negative electrode current collector plate may include a negative electrode tab coupling portion coupled to the negative electrode uncoated portion by the negative electrode welding portion; and a can coupling portion electrically coupled to the beading part, and the negative electrode tab coupling portion may be coupled to an area in which the plurality of segments are overlapped in multiple layers.

In an embodiment of the present disclosure, each of the one or more positive electrode tab coupling portions may include one of the one or more positive electrode welding portions, each of the one or more negative electrode tab coupling portions may include one of the one or more negative electrode welding portions, and the number of the positive electrode tab coupling portions may be smaller than the number of the negative electrode tab coupling portions.

Preferably, the one or more positive electrode welding portions and the one or more negative electrode welding portions may extend along a radial direction of the electrode assembly.

As another example, each of the one or more positive electrode tab coupling portions may include one of the one or more positive electrode welding portions, each of the one or more negative electrode tab coupling portions may include one of the one or more negative electrode welding portions, and the number of the positive electrode welding portions may smaller than the number of the negative electrode welding portions.

As another example, each of the one or more positive electrode tab coupling portions includes one of the one or more positive electrode welding portions, each of the one or more negative tab coupling portions may include one of the one or more negative electrode welding portions, the number of the positive electrode tab coupling portions may be equal to the number of the negative electrode tab coupling portions, and an area of one positive electrode welding portion of the one or more positive electrode tab welding portions may be smaller than an area of one negative electrode welding portion of the one or more negative electrode tab welding portions.

In another aspect, the battery can may further include a crimping part that is formed at a side toward the open portion more than the beading part and is extended and bent toward the open portion.

Preferably, the can coupling portion may be compressed and fixed by the crimping part.

Preferably, the can coupling portion may include a contact portion coupled on the beading part by welding; and a connection portion configured to connect the negative electrode tab coupling portion to the contact portion.

Preferably, the contact portion may be coupled on the beading part by welding.

Preferably, the contact portion may have an arc shape extending in a circumferential direction along the beading part of the battery can.

In another aspect, the cylindrical secondary battery may further comprise a sealing gasket between the battery can and the cap plate, and the contact portion may be interposed between the sealing gasket and the beading part.

In an example, in the positive electrode current collector plate, the rim portion, the positive electrode tab coupling portion and the terminal coupling portion may be all in the same plane.

In another example, in the negative electrode current collector plate, the negative electrode tab coupling portion and the can coupling portion may not be in the same plane.

The present disclosure provides a battery pack comprising at least one cylindrical secondary battery, and a vehicle comprising at least one battery pack.

Advantageous Effects

According to one aspect of the present disclosure, by making the coupling area S1 between the positive electrode uncoated portion and the positive electrode current collector plate smaller than the coupling area S2 between the negative electrode uncoated portion and the negative electrode current collector plate, the movement speed of lithium ions may be controlled. There is no need to adjust the chemistry balance between the positive electrode and the negative electrode, and without adjusting the chemistry balance between the positive electrode and the negative electrode, it is possible to control the movement speed of lithium ions to a greater extent compared to the chemistry balance adjustment method. It is possible to provide a cylindrical secondary battery that may control the movement speed of lithium ions, is easy to charge quickly and has excellent cycle characteristics, within the limit of the process realization capability due to the composition of the active material layer, that is, while maintaining the existing process window.

The cylindrical secondary battery according to the present disclosure is very suitable for a large-sized battery having an increased form factor. It is designed so that the positive electrode uncoated portion and the negative electrode uncoated portion are located on the top and bottom of the jelly-roll type electrode assembly, respectively, and a positive electrode current collector plate is welded to the positive electrode uncoated portion and a negative electrode current collector plate is welded to the negative electrode uncoated portion to manufacture a cylindrical secondary battery having a structure with improved current collection efficiency, or a so-called tab-less cylindrical secondary battery. According to the present disclosure, by using the uncoated portion itself protruding from the upper and lower portions of the electrode assembly as an electrode tab, it is possible to reduce the internal resistance of the secondary battery and increase the energy density.

When the cylindrical secondary battery is applied to a device such as a vehicle, external impacts and vibrations may be frequently applied in the course of use, which may cause damage to a coupling portion for electrical connection between components. This damage to the coupling portion causes product defects. Alternatively, when the coupling portion for electrical connection is damaged, if the electrical connection is not completely cut off but the welding region is partially damaged to reduce the coupling area between components, excessive heat generation or component shape deformation may occur due to an increase in resistance, causing internal short circuits. According to another aspect of the present disclosure, there is provided a cylindrical secondary battery including a positive electrode current collector plate having a structure that may prevent force from being concentrated on a coupling portion between components even when external impact and/or vibration is applied during use, so the mechanical and electrical performance of the secondary battery is improved.

According to another aspect of the present disclosure, there is provided a cylindrical secondary battery including a negative electrode current collector plate having a structure suitable for an electrode assembly having a low resistance structure. This negative electrode current collector plate not only has a structure capable of improving the coupling force of the coupling portion with the battery can, but also improves the energy density of the cylindrical secondary battery. Accordingly, the mechanical and electrical performance of the cylindrical secondary battery is improved.

DESCRIPTION OF DRAWINGS

The accompanying drawings illustrate a preferred embodiment of the present disclosure and together with the following disclosure, serve to provide further understanding of the technical features of the present disclosure, and thus, the present disclosure is not construed as being limited to the drawings.

BEST MODE

Figure 1:
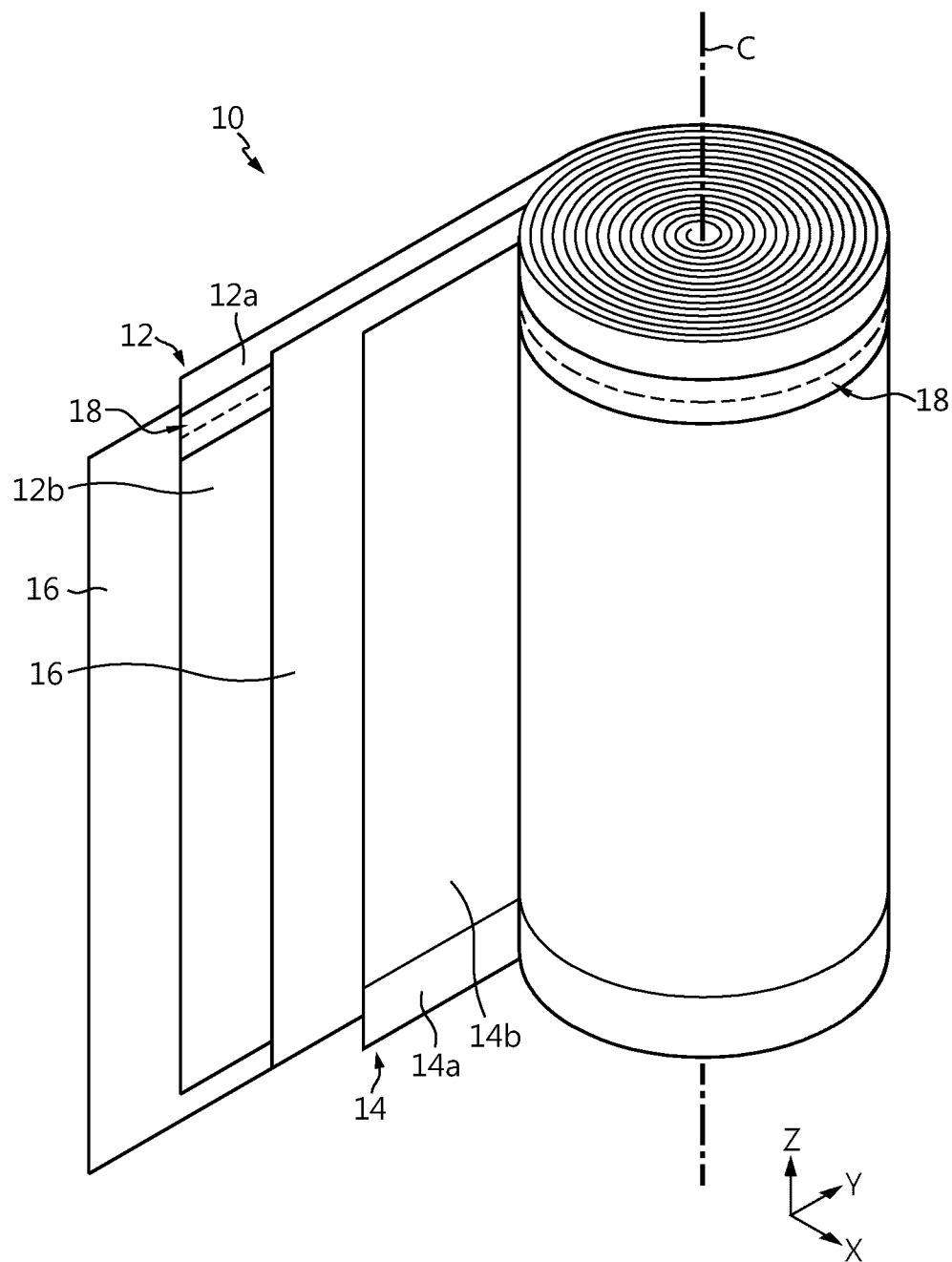
FIG. 1 is a view for explaining an electrode assembly that may be included in a cylindrical secondary battery according to an embodiment of the present disclosure.

Hereinafter, preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description provided herein and illustration in the drawings are just some preferred embodiments of the present disclosure, but not intended to fully describe the technical features of the present disclosure, so it should be understood that other equivalents and modifications could be made thereto at the time of filing the patent application.

In addition, in order to help the understanding of the present disclosure, the accompanying drawings are not drawn to scale, but dimensions of some components may be exaggerated. Also, the same reference signs may be assigned to the same components in different embodiments.

FIG. 1 is a view for explaining an electrode assembly that may be included in a cylindrical secondary battery according to an embodiment of the present disclosure.

Referring to FIG. 1, the electrode assembly 10 is a jelly-roll type electrode assembly having a structure in which a positive electrode plate 12 and a negative electrode plate 14 and a separator 16 interposed therebetween are wound in one direction. The electrode assembly 10 may be manufactured by winding a stack formed by sequentially stacking the positive electrode plate 12, the separator 16, the negative electrode plate 14 and the separator 16 at least once with reference to the winding center C. After the winding is completed, the electrode assembly 10 has an approximately cylindrical shape. When viewed from the top or bottom of electrode assembly 10, the outline shape of the electrode assembly 10 is circular.

The positive electrode plate 12 has a structure in which a positive electrode active material layer 12b is coated on one side or both sides of a sheet-shaped positive electrode current collector having a long side and a short side, and includes a positive electrode uncoated portion 12a at one long side end along the winding direction X. The positive electrode uncoated portion 12a may be continuously formed along one end of the positive electrode plate 12. The negative electrode plate 14 also has a structure in which a negative electrode active material layer 14b is coated on one or both sides of a sheet-shaped negative electrode current collector having a long side and a short side, and includes a negative electrode uncoated portion 14a not coated with an active material at one long side end along the winding direction X. The negative electrode uncoated portion 14a may also be continuously formed along one end of the negative electrode plate 14.

The current collector may be appropriately selected according to the polarity of the electrode plate, and aluminum, copper, nickel, or stainless steel may be used as a material thereof, but is not necessarily limited thereto, and metals and metal alloys commonly used as materials of a current collector can be adopted. For example, the positive electrode current collector may be aluminum or an aluminum alloy, and the negative electrode current collector may be copper or a copper alloy.

In the present disclosure, the positive electrode active material coated on the positive electrode current collector and the negative electrode active material coated on the negative electrode current collector may be any type of active material, provided that the active material is well known in the art.

In an example, the positive electrode active material may include an alkali metal compound expressed by a general chemical formula $A[A_xM_y]O_{2+z}$ (A includes at least one of Li, Na, and K; M includes at least one element selected from Ni, Co, Mn, Ca, Mg, Ti, Si, Fe, Mo, V, Zr, Zn, Cu, Al, Mo, Sc, Zr, Ru, and Cr; $x \geq 0$, $1 \leq x+y \leq 2$, $-0.1 \leq z \leq 2$; and stoichiometric coefficients x, y, and z are selected so that the compound maintains electrically neutral).

Preferably, the positive electrode active material contains lithium transition metal oxide. The lithium transition metal oxide may contain nickel-cobalt-manganese-based lithium oxides, among which a high-concentration nickel-cobalt-manganese-based lithium oxide having a high nickel content may be included.

In another embodiment, the positive electrode active material may be an alkali metal compound $xLiM^1O_2(1-x)Li_2M^2O_3$ ($M^1$ includes at least one element having an average oxide state of 3; $M^2$ includes at least one element having an average oxidation state of 4; and $0 \leq x \leq 1$) disclosed in U.S. Pat. Nos. 6,677,082, 6,680,143, etc.

In another example, the positive electrode active material may be lithium metal phosphate expressed by a general chemical formula $Li_aM^1_xFe_{1-x}M^2_yP_{1-y}M^3_zO_{4-z}$ ($M^1$ includes at least one element selected from Ti, Si, Mn, Co, Fe, V, Cr, Mo, Ni, Nd, Mg, and Al; $M^2$ includes at least one element selected from Ti, Si, Mn, Co, Fe, V, Cr, Mo, Ni, Nd, Mg, Al, As, Sb, Si, Ge, V, and S; $M^3$ includes an element of a halogen group optionally containing F; $0<a\leq2$, $0\leq x\leq1$, $0\leq y<1$, $0\leq z<1$; and stoichiometric coefficients a, x, y, and z are selected so that the compound maintains electrically neutral), or $Li_3M_2(PO_4)_3$ (M includes at least one element selected from Ti, Si, Mn, Fe, Co, V, Cr, Mo, Ni, Mg, and Al).

Preferably, the positive electrode active material may include primary particles and/or secondary particles in which the primary particles are aggregated.

In an example, the negative electrode active material may use a carbon material, lithium metal or lithium metal compounds, silicon or silicon compounds, tin or tin compounds, etc. Metal oxide such as $TiO_2$ or $SnO_2$ having a potential of less than 2 V may be also used as the negative electrode active material. As the carbon material, low crystalline carbon and high crystalline carbon may be used.

The separator 16 may include a porous polymer film, for example, made of a polyolefin-based polymer such as an ethylene homopolymer, a propylene homopolymer, an ethylene/butene copolymer, an ethylene/hexene copolymer, or an ethylene/methacrylate copolymer, in a single or stack structure thereof. In another example, the separator 16 may be a common porous non-woven fabric, for example, a non-woven fabric made of glass fiber having a high melt point or polyethylene terephthalate fiber.

At least one surface of the separator 16 may include a coating layer of inorganic particles. Otherwise, the separator 16 itself may be made of a coating layer of inorganic particles. The inorganic particles included in the coating layer may be coupled with a binder so that an interstitial volume exists between adjacent particles.

The inorganic particles may include an inorganic material having a dielectric constant of 5 or more. In a non-limiting example, the inorganic particles may include at least one material selected from the group consisting of $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO, and $Y_2O_3$.

An insulating coating layer 18 may be further formed at the boundary between the active material layers 12b, 14b and the uncoated portions 12a, 14a. At least a part of the insulating coating layer 18 may be formed to overlap the boundary between the active material layers 12b, 14b and the uncoated portions 12a, 14a. The insulating coating layer 18 may include a polymer resin and may include an inorganic filler such as $Al_2O_3$. Electrical contact between positive electrode plate 12 and negative electrode plate 14 may be effectively prevented by the insulating coating layer 18. The insulating coating layer 18 may be omitted. The insulating coating layer 18 may play a role of mechanically supporting the uncoated portions 12a, 14a from the side so as not to excessively bend toward the separator 16 when bending the uncoated portions 12a, 14a.

The uncoated portions 12a, 14a are arranged in opposite directions to each other. In addition, each of the uncoated portions 12a, 14a is exposed to the outside of the separator 16. In the electrode assembly 10, at least a part of the positive electrode uncoated portion 12a itself may be used as a positive electrode tab, and at least a part of the negative electrode uncoated portion 14a itself may be used as a negative electrode tab.

Figure 2:
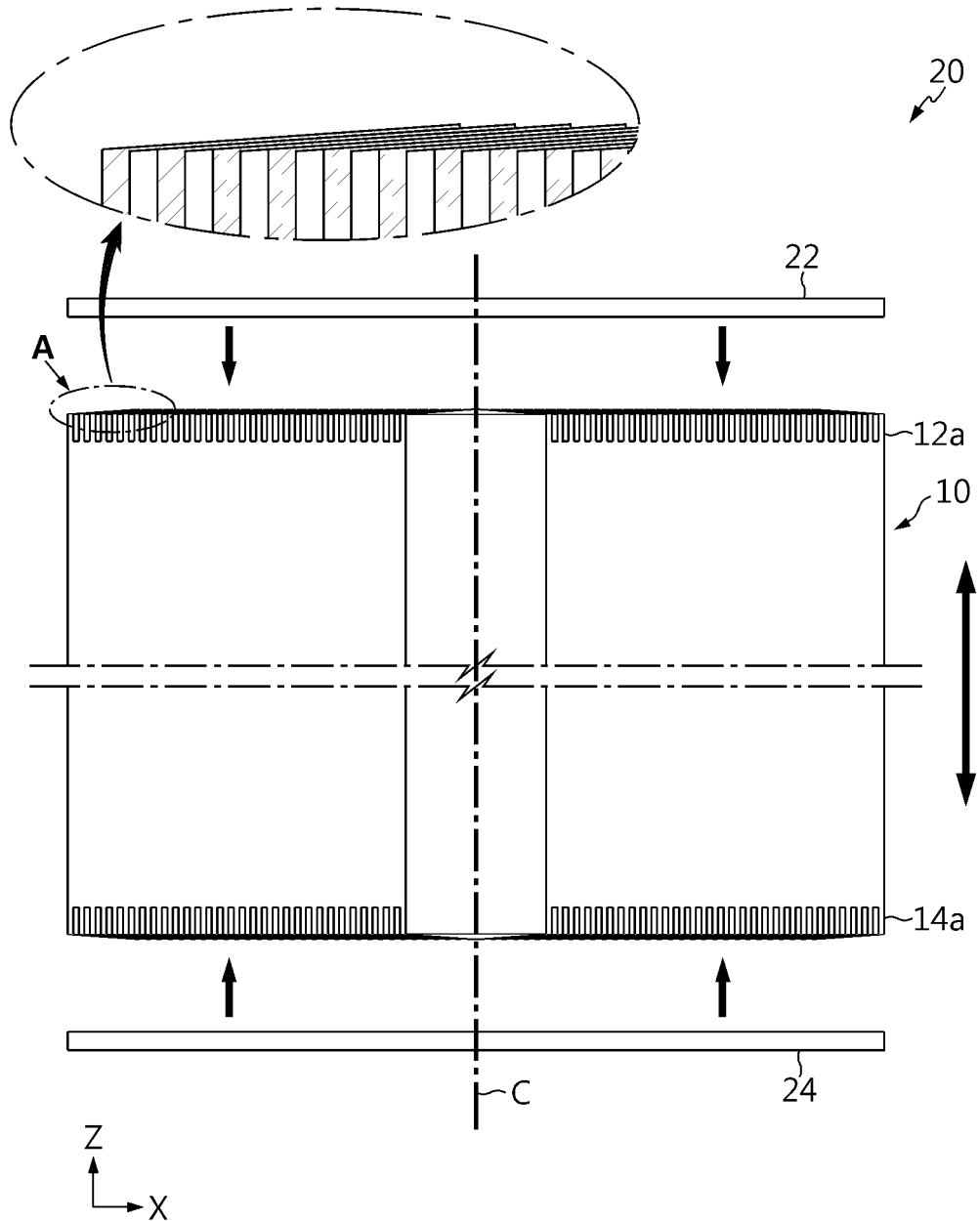
FIG. 2 is a schematic diagram of a cylindrical secondary battery according to an embodiment of the present disclosure.

FIG. 2 is a schematic diagram of a cylindrical secondary battery according to an embodiment of the present disclosure.

Referring to FIG. 2, the cylindrical secondary battery 20 may include the electrode assembly 10 described with reference to FIG. 1. The cylindrical secondary battery 20 further includes a positive electrode current collector plate 22 and a negative electrode current collector plate 24. They may be accommodated together with the electrolyte solution in a battery can (not shown), which is an external case.

The electrolyte may be a salt having a structure such as $A^+B^-$. Here, $A^+$ includes an alkali metal cation such as $Li^+$, $Na^+$, or $K^+$ or a combination thereof. In addition, $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The electrolyte may also be dissolved in an organic solvent and used as an electrolytic solution. The organic solvent may include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof.

In the electrode assembly 10 of FIG. 1, a separate current collector tab is not coupled to each of the uncoated portions 12a, 14a, and is itself used as an electrode tab. The electrode assembly 10 includes the positive electrode uncoated portion 12a on the top of the electrode assembly 10, and includes the negative electrode uncoated portion 14a on the bottom of the electrode assembly 10. In other words, the positive electrode uncoated portion 12a is provided to the upper portion of the electrode assembly 10 in the height direction (parallel to the Z-axis), and the negative electrode uncoated portion 14a is provided to the lower portion of the electrode assembly 10 in the height direction.

As shown in FIG. 2, the positive electrode current collector plate 22 covers the top of the electrode assembly 10, and the negative electrode current collector plate 24 covers the bottom of the electrode assembly 10, and they may be accommodated in the battery can, not shown. The positive electrode current collector plate 22 and the negative electrode current collector plate 24 may have the same outline shape as the top and bottom of the electrode assembly 10. For example, the positive electrode current collector plate 22 and the negative electrode current collector plate 24 may have a disk shape. Of course, the specific shape of the positive electrode current collector plate 22 and the negative electrode current collector plate 24 and the location in the battery can may be different from those shown in the drawings.

The positive electrode current collector plate 22 may be made of the same metal as the positive electrode current collector of the positive electrode plate 12 of the electrode assembly 10, or may be made of a material that is well welded to the positive electrode current collector. The negative electrode current collector plate 24 may be made of the same metal as the negative electrode current collector of the negative electrode plate 14 of the electrode assembly 10, or may be made of a material that is well welded to the negative electrode current collector. For example, the positive electrode current collector plate 22 may be made of aluminum, aluminum alloy, steel, stainless steel, etc., and the negative electrode current collector plate 24 may be made of copper, copper alloy, nickel, nickel alloy, steel, stainless steel, or a composite material thereof. For example, the negative electrode current collector plate 24 may be made of a clad metal in which nickel is plated on copper.

The positive electrode current collector plate 22 is coupled to the positive electrode uncoated portion 12a of the electrode assembly 10. The negative electrode current collector plate 24 is coupled to the negative electrode uncoated portion 14a of the electrode assembly 10. The positive electrode uncoated portion 12a and the positive electrode current collector plate 22 are directly coupled through welding. The negative electrode uncoated portion 14a and the negative electrode current collector plate 24 are also directly coupled through welding. A welding portion is formed in each welding region. The present disclosure is not limited by the welding type of the positive electrode current collector plate 22, the welding position of the positive electrode uncoated portion 12a, the welding type of the negative electrode current collector plate 24, and the welding position of the negative electrode uncoated portion 14a. As the welding method, for example, laser welding, resistance welding, ultrasonic welding, etc. are possible, but the welding method is not limited thereto.

Each current collector plate 22, 24 induces the current generated in each electrode plate 12, 14 of the electrode assembly 10 to each electrode terminal. Each of the current collector plates 22, 24 is a component connected to draw a current from each of the uncoated portions 12a, 14a, which are the ends of the electrode plates 12, 14, respectively. For welding each of the current collector plates 22, 24 and each of the uncoated portions 12a, 14a, each of the uncoated portions 12a, 14a forming the end of the electrode assembly 10 wound in a jelly-roll type is bent to be flattened to make surface contact with each of the current collector plates 22, 24, and then laser welding may be performed.

Preferably, each of the uncoated portions 12a, 14a is bent toward the winding center C of the electrode assembly 10 as shown in FIG. 2. The bent state of the positive electrode uncoated portion 12a may be seen through the enlarged view of section A. The bent state of the negative electrode uncoated portion 14a is similar to this. After each of the uncoated portions 12a, 14a is bent, each of the current collector plates 22, 24 is coupled to each of the uncoated portions 12a, 14a by welding. As the positive electrode uncoated portion 12a serves as a positive electrode tab and the negative electrode uncoated portion 14a serves as a negative electrode tab, and as the positive electrode current collector plate 22 and the negative electrode current collector plate 24 are connected to external electrode terminals, a current path is formed with a large cross-sectional area along the winding axis direction (refer to the arrow) of the electrode assembly 10, so the resistance of the secondary battery may be lowered. This structure is particularly suitable for high-power secondary batteries.

Since each of the current collector plates 22, 24 is directly connected to each of the uncoated portions 12a, 14a by welding to draw current in and out, a separate current collector tap is unnecessary. Therefore, the installation process of the current collector tab is unnecessary, so it is possible to improve productivity. In addition, since the space for accommodating the current collector tab may be reduced, the entire secondary battery becomes compact and space utilization is improved.

Here, it is important that the coupling area S1 between the positive electrode uncoated portion 12a and the positive electrode current collector plate 22 is smaller than the coupling area S2 between the negative electrode uncoated portion 14a and the negative electrode current collector plate 24 (S1<S2). The coupling between each uncoated portion and each current collector plate is achieved by the welding portion. The welding portion becomes a current path from the uncoated portion to the current collector plate and from the current collector plate to the uncoated portion, and the area of the welding portion, that is, the welding area, corresponds to the coupling area or the direct contact area between the current collector plate and the uncoated portion. The larger the coupling area, the wider the current path, so the resistance becomes smaller. If the resistance at the positive electrode is increased by making the coupling area S1 between the positive electrode uncoated portion 12a and the positive electrode current collector plate 22 smaller than the coupling area S2 between the negative electrode uncoated portion 14a and the negative electrode current collector plate 24, the kinetic balance of the positive electrode and the negative electrode may be obtained.

Although various types of active materials have been exemplified above, within the range of the types of positive electrode active material and negative electrode active material generally used, the lithium-ion movement speed at the positive electrode tends to be faster than the lithium-ion movement speed at the negative electrode. When the lithium-ion movement speed in each electrode is significantly different, the battery reaction such as charging and discharging cannot occur smoothly. Specifically, in the case of charging, lithium ions must move from the positive electrode to the negative electrode. The lithium-ion movement speed is fast at the positive electrode, but the lithium-ion movement speed is slow at the negative electrode. If lithium ions moving from the positive electrode do not move smoothly and are stagnant at the negative electrode, damage such as lithium precipitation occurs. In the case of fast charging, it is even worse. Therefore, it is desirable to balance the kinetics of the positive electrode and the negative electrode by deliberately reducing the movement speed of lithium ions in the positive electrode.

Of course, the kinetic balance of the positive electrode and the negative electrode may be obtained by intentionally increasing the lithium-ion movement speed at the negative electrode. However, this method is a chemistry balance method such as increasing the porosity of the negative electrode to secure a lot of space for lithium ions to move, or increasing the content of the conductive material included in the negative electrode active material layer. In the former case, since the thickness of the negative electrode plate is increased, it is not preferable in terms of energy density. In the latter case, since there is a problem of increasing the cost, it is not preferable in terms of industrial applicability. Therefore, it is preferable to lower the lithium-ion movement speed in the positive electrode if it is within an acceptable range in the process margin. A conventional method of lowering the lithium-ion movement speed in the positive electrode is a chemistry balance method such as lowering the content of the conductive material included in the positive electrode active material layer. Since the composition range of the active material layer that can be used in an actual lithium secondary battery is set to some extent, there is a limit to the extent to which adjustment is made by such a chemistry balance method.

The present disclosure does not control the lithium-ion movement speed by adjusting resistance through the composition of the positive electrode active material and the negative electrode active material like the chemistry balance method, but rather, adjusts the resistance caused by the coupling area between the current collector plate and the uncoated portion in each electrode to affect the movement speed of lithium ions in each electrode plate. Specifically, by making the coupling area S1 between the positive electrode current collector plate and the positive electrode uncoated portion smaller than the coupling area S2 between the negative electrode current collector plate and the negative electrode uncoated portion, the resistance in the positive electrode current collector plate is increased greater than the resistance in the negative electrode current collector plate. During charging, electrons must move from the positive electrode to the negative electrode so that lithium ions moving from the positive electrode can be received at the negative electrode. By making the resistance of the positive electrode a little larger, it is possible to cause a kind of bottleneck in the flow of electrons to move from the positive electrode to the negative electrode, thereby reducing the movement speed of lithium ions in the positive electrode.

Hereinafter, various embodiments for implementing the relationship S1<S2 will be described.

Figure 3:
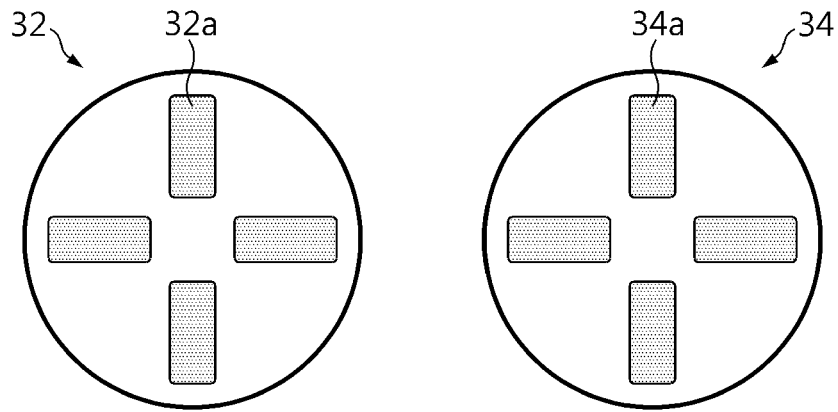
FIG. 3 is a view showing a positive electrode current collector plate and a negative electrode current collector plate according to a comparative example.

First, a comparative example in which S1=S2 is explained to help understanding. FIG. 3 is a view showing a positive electrode current collector plate and a negative electrode current collector plate according to a comparative example.

Referring to FIG. 3, the positive electrode current collector plate 32 and the negative electrode current collector plate 34 are shown in a disk shape. In FIG. 3, the area of one positive electrode welding portion 32a formed between the positive electrode uncoated portion 12a (FIG. 2) and the positive electrode current collector plate 32 and the area of one negative electrode welding portion 34a formed between the negative electrode uncoated portion 14a (FIG. 2) and the negative electrode current collector plate 34 are equal to each other, and the number of positive electrode welding portions 32a and the number of negative electrode welding portions 34a are equal to each other. That is, the area (welding area or coupling area) of the welded portion welded to the uncoated portion in each current collector plate is the same, without discriminating between the positive electrode current collector plate 32 and the negative electrode current collector plate 34.

Figure 4:
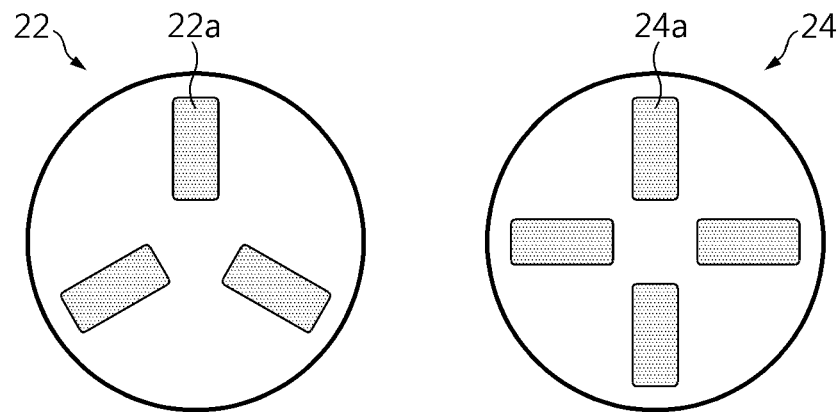
FIG. 4 is a diagram showing a positive electrode current collector plate and a negative electrode current collector plate according to an embodiment of the present disclosure.

Meanwhile, FIG. 4 is a diagram showing a positive electrode current collector plate and a negative electrode current collector plate according to an embodiment of the present disclosure.

Referring to FIG. 4, the area of one positive electrode welding portion 22a formed between the positive electrode uncoated portion 12a (FIG. 2) and the positive electrode current collector plate 22 and the area of one negative electrode welding portion 24a formed between the negative electrode uncoated portion 14a (FIG. 2) and the negative electrode current collector plate 24 are the same, and the number of negative electrode welding portions 24a is greater than the number of positive electrode welding portions 22a. As an example, the case where the number of positive electrode welding portion 22a is three and the number of negative electrode welding portion 24a is four is illustrated. In this way, by making the welding portions have the same area and adjusting the number of welding portions, the coupling area S1 between the positive electrode uncoated portion 12a and the positive electrode current collector plate 22 and the coupling area S2 between the negative electrode uncoated portion 14a and the negative electrode current collector plate 24 may the relationship of S1<S2.

In the illustrated example, the positive electrode welding portion 22a and the negative electrode welding portion 24a may be formed to extend along the radial direction of the electrode assembly 10. Each welding portion 22a, 24a may include a welding bead. The size and shape of the welding beads constituting the welding portions 22a, 24a may be different. For example, the welding bead may be in the shape of a single circle by spot welding. The welding bead may have a shape in which a plurality of circle shapes are overlapped. The overlapped circle shapes may form a continuous line, or a shape approximately like a triangle. The welding portion includes not only a case in which welding beads are formed separately in this way and thus distinguished from each other, but also a case in which at least some of welding beads overlap to form a single mass. In the example shown in FIG. 4, each of the welding portions 22a, 24a has a continuous line shape as an example, but a case in which single circular shapes are interspersed and extended discontinuously along the radial direction of the electrode assembly 10 is not excluded. When multiple welding beads are formed, the total weld area is determined by summing the areas of every welding bead.

In addition, the welding bead is not formed planar only on the surfaces of two members to be coupled by welding, but has a three-dimensional shape with a thickness that extends to at least the contact interface of the two members. The area of the welding portion as used in this specification may be regarded as a cross-sectional area of the welding bead at the contact interface between the current collector plate and the uncoated portion. However, the cross-sectional area at the contact interface is difficult to manage as a design factor. For welding under normal conditions, there is a correspondence between the cross-sectional area at the contact interface and the area at the surface. Therefore, the area on the surface that is easy to manage as a design factor will be defined as the area of the welding portion.

Figure 5:
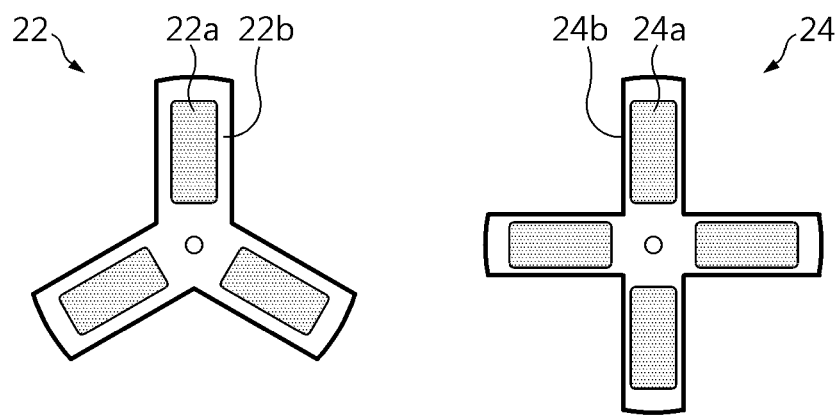
FIGS. 5 to 9 are views showing a positive electrode current collector plate and a negative electrode current collector plate according to another embodiment of the present disclosure.

FIG. 5 is a view showing a positive electrode current collector plate and a negative electrode current collector plate according to another embodiment. Compared to the positive electrode current collector plate 22 and the negative electrode current collector plate 24 shown in FIG. 4 in the disc shape, the positive electrode current collector plate 22 and the negative electrode current collector plate 24 of FIG. 5 have changed shapes.

Referring to FIG. 5, the positive electrode current collector plate 22 includes one or more strips 22b extending along the radial direction of the electrode assembly 10 from the center of the positive electrode current collector plate 22. A positive electrode welding portion 22a is formed on the strip 22b of the positive electrode current collector plate 22, and is coupled to the positive electrode uncoated portion 12a. The negative electrode current collector plate 24 also includes one or more strips 24b extending from the center of the negative electrode current collector plate 24 along the radial direction of the electrode assembly 10, and a negative electrode welding portion 24a is formed on the strip 24b of the negative electrode current collector plate 24 and is coupled to the negative electrode uncoated portion 14a.

Two or more strips 22b of the positive electrode current collector plate 22 may be arranged at equal intervals, and two or more strips 24b of the negative electrode current collector plate 24 may be arranged at equal intervals. When forming the welding portion on each strip, it may be desirable to arrange the strips at equal intervals from each other in terms of forming a current path from each electrode tab evenly.

The shape and number of strips may vary, and the number of strips 22b of the positive electrode current collector plate 22 may be smaller than the number of strips 24b of the negative electrode current collector plate 24. For example, if the number of strips 24b of the negative electrode current collector plate 24 is M, the number of strips 22b of the positive electrode current collector plate 22 may be 1 to M−1 (M is a natural number equal to or greater than 2). In the example in FIG. 5, there are three strips 22b of the positive electrode current collector plate 22 and four strips 24b of the negative electrode current collector plate 24. If the strips are arranged at equal intervals from each other, the strips 22b of the positive electrode current collector plate 22 of FIG. 5 may be arranged in a Y-shape. The strips 24b of the negative electrode current collector plate 24 may be arranged in a cross shape.

One welding portion may be formed for each strip. In the case where the number of strips 22b of the positive electrode current collector plate 22 is smaller than the number of strips 24b of the negative electrode current collector plate 24, if the area of one positive electrode welding portion 22a is not greater than the area of one negative electrode welding portion 24a, the coupling area S1 between the positive electrode uncoated portion 12a and the positive electrode current collector plate 22 and the coupling area S2 between the negative electrode uncoated portion 14a and the negative electrode current collector plate 24 may have the relationship of S1<S2.

Figure 6:
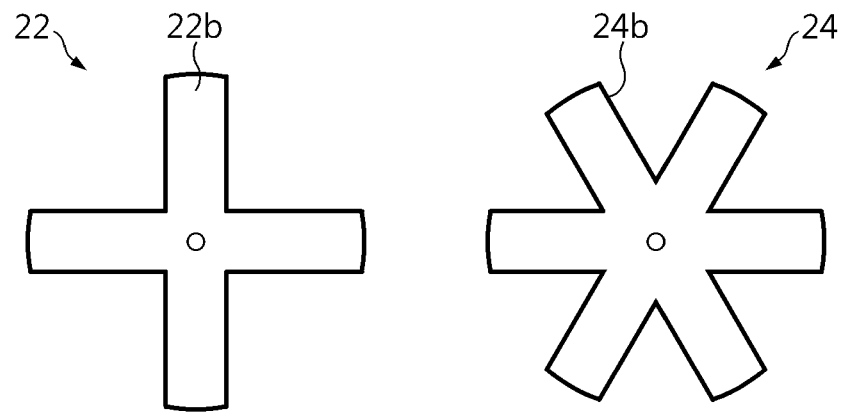
Figure 7:
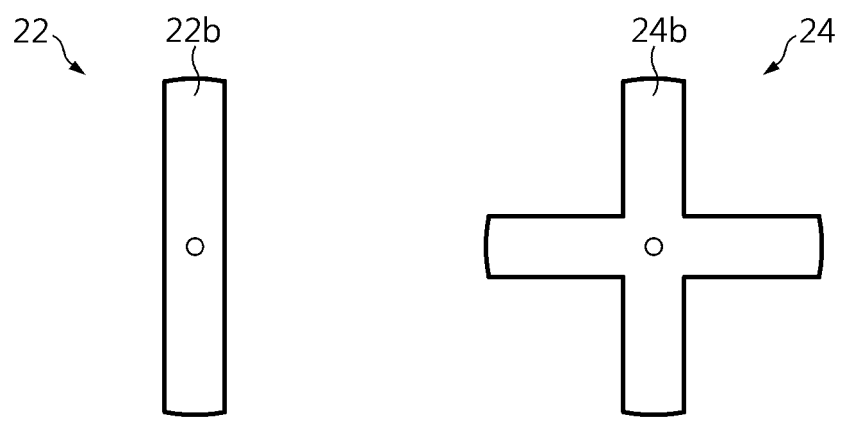
Figure 8:
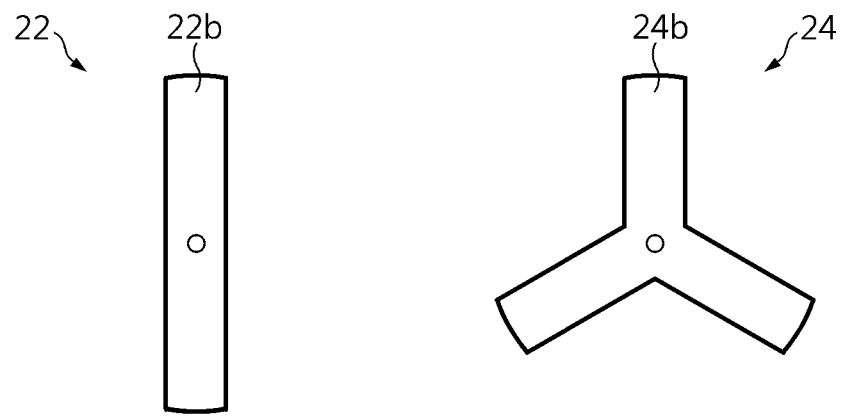

FIGS. 6 to 8 are modified examples of FIG. 5. In FIG. 6, the number of strips 22b of the positive electrode current collector plate 22 is four and the number of strips 24b of the negative electrode current collector plate 24 is six. In the example in FIG. 7, the number of strips 22b of the positive electrode current collector plate 22 is two and the number of strips 24b of the negative electrode current collector plate 24 is four. In an example in FIG. 8, the number of strips 22b of the positive electrode current collector plate 22 is two and the number of strips 24b of the negative electrode current collector plate 24 is three.

In the embodiments exemplified above, the area of one welding portion in each current collector plate is the same, but the number of welding portions formed on the positive electrode current collector plate 22 is reduced so that the coupling area S1 between the positive electrode uncoated portion 12a and the positive electrode current collector plate 22 is smaller than the coupling area S2 between the negative electrode uncoated portion 14a and the negative electrode current collector plate 24.

As another example to make the coupling area S1 between the positive electrode uncoated portion 12a and the positive electrode current collector plate 22 smaller than the coupling area S2 between the negative electrode uncoated portion 14a and the negative electrode current collector plate 24, even though the number of welding portions in each current collector plate is the same, it may be possible to make the area of one welding portion formed on the positive electrode current collector plate 22 smaller than the area of one welding portion formed on the negative electrode current collector plate 24. However, since there may be a contact risk when the area of one welding portion is reduced, it is preferable to make the area of one welding portion be the same in each current collector plate 22, 24 and adjust the number of welding portions.

Figure 9:
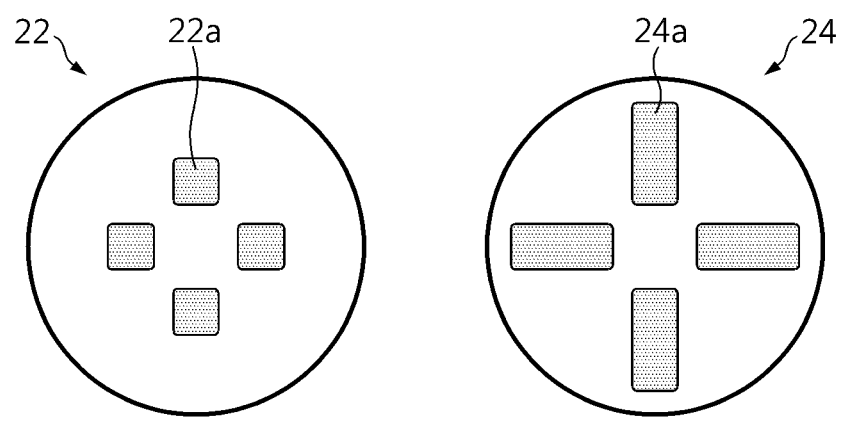

FIG. 9 is a view showing a positive electrode current collector plate and a negative electrode current collector plate according to another embodiment of the present disclosure.

Referring to FIG. 9, the number of positive electrode welding portions 22a formed between the positive electrode uncoated portion 12a (FIG. 2) and the positive electrode current collector plate 22 and the number of negative electrode welding portions 24a formed between the negative electrode uncoated portion 14a (FIG. 2) and the negative electrode current collector plate 24 are equal to each other, but the size of one positive electrode welding portion 22a is smaller than the size of one negative electrode welding portion 24a, thereby satisfying the relationship S1<S2. Here, the positive electrode welding portion 22a and the negative electrode welding portion 24a are also formed to extend along the radial direction of the electrode assembly 10.

In this way, various current collector plates may be implemented by changing the number of welding portions formed on each current collector plate, or by changing the area of one welding portion, or by changing the shape of each electrode plate, or by, for example, designing each electrode plate to include strips and changing the number of strips, the number of welding portions formed on one strip. In this case, the movement speed of lithium ions may be controlled satisfying the condition that the coupling area S1 between the positive electrode uncoated portion and the positive electrode current collector plate is smaller than the coupling area S2 between the negative electrode uncoated portion and the negative electrode current collector plate. In addition, in further consideration of the resistance of the positive electrode active material and the negative electrode active material, the kinetic balance between the positive electrode and the negative electrode may be adjusted more precisely by having an appropriate coupling area ratio (S1/S2) in the positive electrode current collector plate and the negative electrode current collector plate.

Since it is desirable for process management to apply the same welding process to the positive electrode and the negative electrode, one welding portion of the same area is formed for each strip, and the coupling area S1 between the positive electrode uncoated portion 12a and the positive electrode current collector plate 22 and the coupling area S2 between the negative electrode uncoated portion 14a and the negative electrode current collector plate 24 have the relationship of S1<S2 by setting so that the number of strips 24b of the negative electrode current collector plate 24 is M and the number of strips 22b of the positive electrode current collector plate 22 is 1 to M−1 (M is a natural number greater than or equal to 2). Then, the ratio (S1/S2) of the appropriate coupling area in the positive electrode current collector plate and the negative electrode current collector plate may be adjusted within the range of 1/M to (M−1)/M. In addition, the ratio (S1/S2) of the appropriate coupling area in the positive electrode current collector plate and the negative electrode current collector plate may be determined in consideration of both the welding strength and the resistance by the number of welding portions.

FIGS. 6 to 8 are modified examples of FIG. 5. In FIG. 6, the number of strips 22b of the positive electrode current collector plate 22 is four and the number of strips 24b of the negative electrode current collector plate 24 is six. In the example in FIG. 7, the number of strips 22b of the positive electrode current collector plate 22 is two and the number of strips 24b of the negative electrode current collector plate 24 is four. In an example in FIG. 8, the number of strips 22b of the positive electrode current collector plate 22 is two and the number of strips 24b of the negative electrode current collector plate 24 is three.

From the viewpoint of efficiently drawing current in and out and reducing internal resistance, the larger the coupling areas S1 and S2, the better. Conventionally, the focus is on minimizing the resistance, so the welding area was unconditionally enlarged, and the individual characteristics of the positive electrode current collector plate and the negative electrode current collector plate are not separately considered. In the present disclosure, each coupling area S1, S2 has an appropriate value in consideration of current inflow/outflow and internal resistance, and the relationship of S1<S2 is satisfied even within such a value range, so that kinetic balance may be achieved between the positive and negative electrodes. Therefore, the present disclosure has technical significance and is highly advanced.

On the other hand, the current has a characteristic of flowing in a low resistance path, so the high C-rate current path during rapid charging is closely related to the number of coupling portions between the current collector plate and the uncoated portion, that is, the number of welding portions. Accordingly, the inventors of the present disclosure suggest that the case of S1<S2 while reducing the number of positive electrode welding portions is more preferable from the viewpoint of easiness of rapid charging.

As described above, in the case of the structure of the positive electrode current collector plate and the negative electrode current collector plate according to the comparative example shown in FIG. 3, the number of welding portions is identically four for each of the positive electrode current collector plate and the negative electrode current collector plate. On the other hand, in the case of the positive electrode current collector plate and the negative electrode current collector plate according to the embodiment of the present disclosure shown in FIG. 4, three welding portions are formed on the positive electrode current collector plate, and four welding portions are formed on the negative electrode current collector plate. The case of FIG. 4 is preferable from the viewpoint of rapid charging.

As such, in the embodiments of the present disclosure, the kinetic balance between the positive electrode and the negative electrode may be controlled by adjusting the coupling area of each current collector plate with the uncoated portion. The coupling area S1 in the positive electrode current collector plate is smaller than the coupling area S2 in the negative electrode current collector plate. While maintaining the interface resistance by using the same active material, conductive material, and binder type and content as in the prior art, it is possible to improve the kinetic balance between the positive electrode and the negative electrode by reducing the lithium-ion movement speed while causing a bottleneck of electron movement due to the increase in resistance caused by the decrease in the contact area at the positive electrode.

As such, according to the present disclosure, it becomes possible to adjust the lithium-ion movement speed to a greater extent by applying a method of adjusting the kinetic balance of lithium ions by controlling the coupling area between the uncoated portion and the current collector plate in the jelly-roll type electrode assembly, without adjusting the chemistry between the positive electrode and the negative electrode. That is, by applying a differential structure in consideration of individual characteristics of each current collector plate, such as changing the number of welding portions in the positive electrode current collector plate and the negative electrode current collector plate, the characteristics of a cylindrical secondary battery including the same may be improved.

As such, according to the present disclosure, there is no need to adjust the chemistry balance of the positive electrode and the negative electrode, and without adjusting the chemistry balance of the positive electrode and the negative electrode, compared to the chemistry balance adjustment method, it is possible to control the movement speed of lithium ions to more extent. It is possible to provide a cylindrical secondary battery that may control the movement speed of lithium ions, is easy to apply rapid charging and has excellent cycle characteristics, within the limit of the process implementation capability due to the composition of the active material layer, that is, while maintaining the existing process window.

Figure 10:
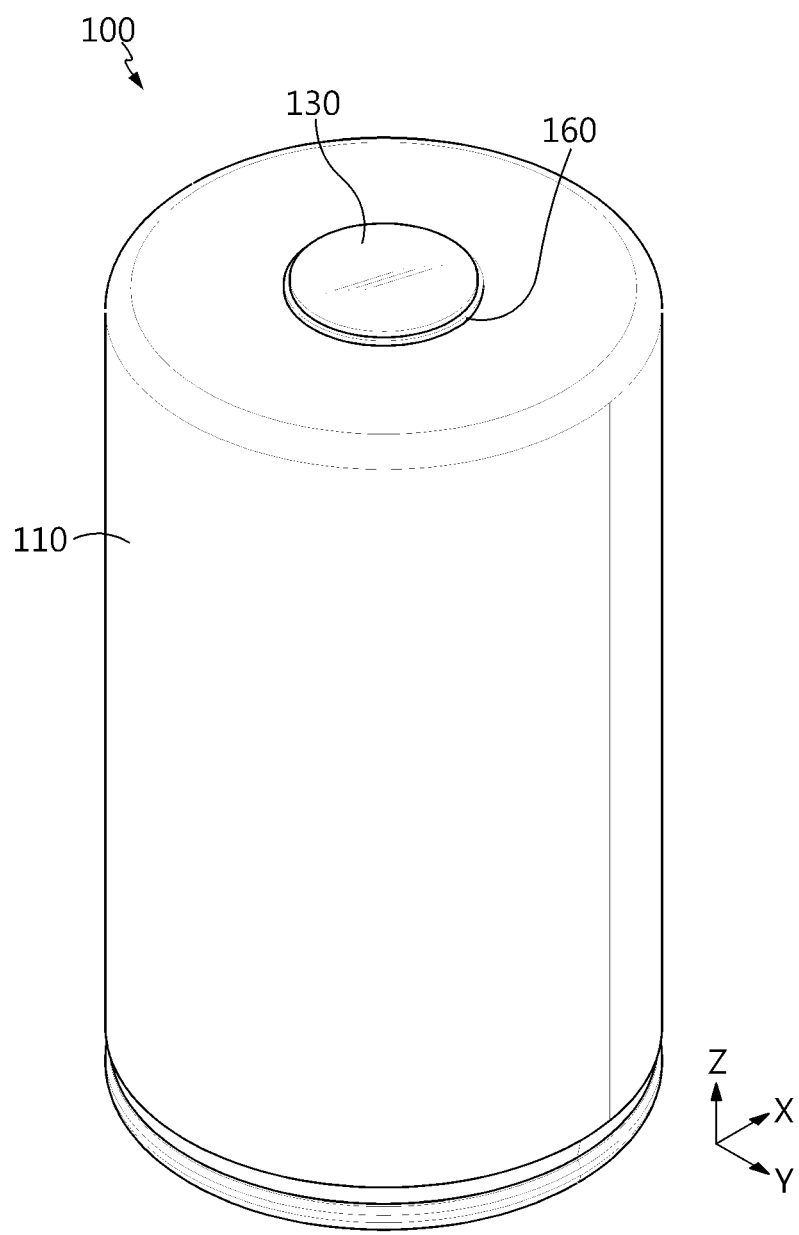
FIG. 10 is a perspective view of a cylindrical secondary battery according to another embodiment of the present disclosure.
Figure 11:
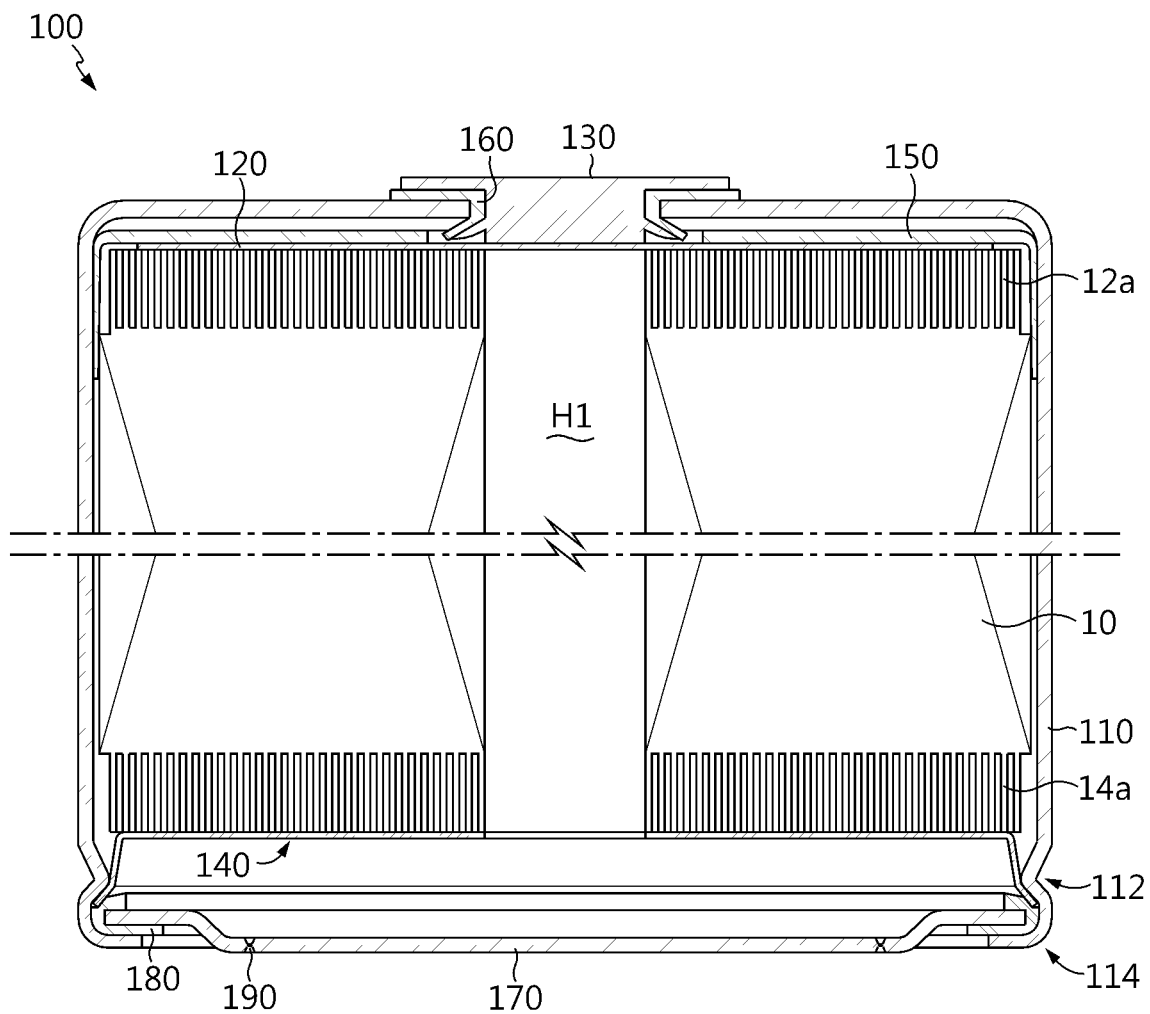
FIG. 11 is a longitudinal cross-sectional view of the cylindrical secondary battery of FIG. 10.

FIG. 10 is a perspective view of a cylindrical secondary battery according to another embodiment of the present disclosure. FIG. 11 is a longitudinal cross-sectional view of the cylindrical secondary battery of FIG. 10.

Referring to FIGS. 10 and 11, the cylindrical secondary battery 100 includes an electrode assembly 10, a positive electrode current collector plate 120, and a negative electrode current collector plate 140. In addition, the cylindrical secondary battery 100 may further include a battery can 110, a rivet terminal 130, an insulator 150, an insulating gasket 160, a cap plate 170, a sealing gasket 180, and the like.

The battery can 110 is approximately cylindrical in shape. The battery can 110 has an open portion formed on one side, at the bottom in this embodiment, and is made of, for example, a material having conductivity such as metal. In the battery can 110, the opposite side of the open portion is a closed portion. The material of the battery can 110 may be, for example, aluminum, steel, or stainless steel. The side surface (outer circumference) and the upper surface of the battery can 110 may be integrally formed. The upper surface of the battery can 110 (the surface parallel to the X-Y plane) has an approximately flat shape. The battery can 110 accommodates the electrode assembly 10 through the open portion, and also accommodates the electrolyte.

Here, the electrode assembly 10 may be the electrode assembly described with reference to FIG. 1 above, and the positive electrode uncoated portion 12a and the negative electrode uncoated portion 14a extend opposite to each other along the height direction (parallel to the Z-axis) of the cylindrical secondary battery 100. The positive electrode uncoated portion 12a extends toward the closed portion of the battery can 110, and the negative electrode uncoated portion 14a extends toward the open portion of the battery can 110. A cavity H1 is formed in the winding center portion of electrode assembly 10.

The battery can 110 is electrically connected to the electrode assembly 10. The battery can 110 is electrically connected to, for example, the negative electrode uncoated portion 14a of the electrode assembly 10. Accordingly, the battery can 110 may have the same polarity as the negative electrode uncoated portion 14a. The entire surface of the battery can 110 may function as a negative electrode terminal.

The rivet terminal 130 may be made of a conductive metal material. The rivet terminal 130 is installed in a through hole formed in the center of the closed portion of the battery can 110. A part of the rivet terminal 130 may be exposed to the upper part of the battery can 110, and the remaining part may be located inside the battery can 110. The rivet terminal 130 may be fixed on the inner surface of the closed portion of the battery can 110 by, for example, riveting.

The insulator 150 is interposed between the closed portion of the battery can 110 and the positive electrode current collector plate 120. The rivet terminal 130 may pass through the insulator 150 and be electrically connected to the positive electrode uncoated portion 12a provided on the positive electrode plate 12 of the electrode assembly 10. In this case, the rivet terminal 130 may have a positive polarity. Therefore, the rivet terminal 130 has the opposite polarity to the battery can 110 and may be used as a positive electrode terminal.

If the rivet terminal 130 has a positive polarity as above, the rivet terminal 130 is installed to be electrically insulated from the battery can 110 having a negative polarity. Electrical insulation between the rivet terminal 130 and the battery can 110 may be realized in various ways. For example, it may be insulated by interposing an insulating gasket 160 between the rivet terminal 130 and the battery can 110. Alternatively, it may be insulated by forming an insulating coating layer on a part of the rivet terminal 130. Alternatively, a method of structurally fixing the rivet terminal 130 so that the contact between the rivet terminal 130 and the battery can 110 is impossible may be applied. Alternatively, a plurality of methods among the methods described above may be applied together.

As described above, the cylindrical secondary battery 100 has a structure in which the rivet terminal 130 and the remaining regions except for the region occupied by the rivet terminal 130 among the upper surfaces of and the battery can 110 can be used as a positive electrode terminal and a negative electrode terminal, respectively. Accordingly, in electrically connecting a plurality of cylindrical secondary batteries 100, both the positive electrodes and the negative electrodes of the cylindrical secondary batteries 100 may be connected in one direction, thereby simplifying the electrical connection structure. In addition, since the cylindrical secondary battery 100 has a structure in which most of the surface opposite to the open portion of the battery can 110 can be used as a negative electrode terminal, it is possible to secure a sufficient area for welding components for electrical connection.

As illustrated in detail in FIG. 11, the battery can 110 may include a beading part 112 and a crimping part 114 formed on the bottom thereof. The beading part 112 is located at the bottom of the electrode assembly 10. The beading part 112 is formed by press-fitting the outer circumference of the battery can 110. The beading part 112 prevents the electrode assembly 10, which may have a size approximately corresponding to the inner diameter of the battery can 110, from coming out through the open portion formed at the bottom of the battery can 110, and may function as a support on which the cap plate 170 is seated.

The crimping part 114 is formed on the side facing the open portion of the battery can 110 than the beading part 112. In this embodiment, the crimping part 114 is formed under the beading part 112. The crimping part 114 has a shape extended and bent toward the open portion of the battery can 110 so as to cover the outer circumference of the cap plate 170 disposed below the beading part 112 and a part of the lower surface of the cap plate 170.

However, the present disclosure does not exclude the case where the battery can 110 does not include the beading part 112 and/or the crimping part 114. That is, in the present disclosure, when the battery can 110 does not include the beading part 112 and/or the crimping part 114, the fixing of the electrode assembly 10 and/or the sealing of the battery can 110 may be realized by, for example, additionally applying a component that can function as a stopper for the electrode assembly 10. In addition, if the cylindrical secondary battery 100 includes the cap plate 170, the fixing of the electrode assembly 10 and/or the sealing of the battery can 110 may be realized by, for example, additionally applying a structure on which the cap plate 170 can be seated and/or welding the battery can 110 and the cap plate 170, or the like. That is, the cap plate 170 may seal the open portion of the battery can 110. For example, the patent publication KR 10-2019-0030016 A of the present applicant discloses a cylindrical battery cell in which a beading part is omitted, and such a structure may be employed in the present disclosure.

Referring to FIG. 11 more, the cap plate 170 may be made of, for example, a metal material to ensure rigidity. The cap plate 170 may cover the open portion of the battery can 110. That is, the cap plate 170 forms the lower surface of the cylindrical secondary battery 100. The cap plate 170 has no polarity even if it is made of a conductive metal material. No polarity may mean that the cap plate 170 is not connected to the electrode assembly 10. In addition, it may mean that it is electrically insulated from the battery can 110 and the rivet terminal 130. Since it has no polarity, the cap plate 170 does not function as either a positive electrode terminal or a negative electrode terminal. The cap plate 170 does not need to be electrically connected to the electrode assembly 10 and the battery can 110, and the material does not necessarily have to be a conductive metal.

When the battery can 110 includes the beading part 112, the cap plate 170 may be seated on the beading part 112 formed on the battery can 110. In addition, when the battery can 110 includes the crimping part 114, the cap plate 170 may be fixed by the crimping part 114. A sealing gasket 180 may be interposed between the cap plate 170 and the crimping part 114 of the battery can 110 to secure the airtightness of the battery can 110.

The cap plate 170 may further include a venting portion 190 formed to prevent the internal pressure from increasing beyond a preset value due to the gas generated inside the battery can 110. The venting portion 190 corresponds to an area of the cap plate 170 having a thinner thickness compared to the surrounding area. The venting portion 190 is structurally weak compared to the surrounding area. Accordingly, when an abnormality occurs in the cylindrical secondary battery 100 and the internal pressure of the battery can 110 increases to a certain level or more, the venting portion 190 is broken and the gas generated inside the battery can 110 is discharged. The venting portion 190 may be formed by partially reducing the thickness of the battery can 110 by, for example, notching one or both surfaces of the cap plate 170.

The positive electrode current collector plate 120 is coupled to the upper portion of the electrode assembly 10. The positive electrode current collector plate 120 is made of a conductive metal material, and is connected to the positive electrode uncoated portion 12a by welding. The negative electrode current collector plate 140 is coupled to the lower portion of the electrode assembly 10. The negative electrode current collector plate 140 is made of a conductive metal material, and is connected to the negative electrode uncoated portion 14a by welding. The peripheral area of the negative electrode current collector plate 140 may be fixed by being interposed between the inner surface of the battery can 110 and the sealing gasket 180. In this case, the negative electrode current collector plate 140 may be welded on the seating surface formed by the beading part 112 of the battery can 110.

In the cylindrical secondary battery 100, the coupling area S1 between the positive electrode uncoated portion 12a and the positive electrode current collector plate 120 is smaller than the coupling area S2 between the negative electrode uncoated portion 14a and the negative electrode current collector plate 140. The advantage in terms of kinetic balance when the relationship of S1<S2 is satisfied is as described above. The positive electrode current collector plate 120 and the negative electrode current collector plate 140 of various embodiments satisfying the relationship of S1<S2 will be described later.

The cylindrical secondary battery 100 may be, for example, a cylindrical secondary battery having a form factor ratio (defined as a value obtained by dividing the diameter of a cylindrical secondary battery by height, that is, a ratio of diameter (D) to height h) greater than about 0.4. Such a secondary battery is suitable, for example, as a high-output, high-capacity secondary battery for a hybrid electric vehicle (HEV).

Here, the form factor means a value indicating the diameter and height of a cylindrical secondary battery. The cylindrical secondary battery 100 may be, for example, a 46110 cell, a 48750 cell, a 48110 cell, a 48800 cell, or a 46800 cell. In the numerical value representing the form factor, the first two numbers indicate the diameter of the cell, the next two numbers indicate the height of the cell, and the last number 0 indicates that the cell has a circular cross section.

The cylindrical secondary battery 100 may have a diameter of about 46 mm, a height of about 110 mm, and a form factor ratio of about 0.418. The cylindrical secondary battery 100 may have a diameter of about 48 mm, a height of about 75 mm, and a form factor ratio of about 0.640. The cylindrical secondary battery 100 may have a diameter of about 48 mm, a height of about 110 mm, and a form factor ratio of about 0.436. The cylindrical secondary battery 100 may have a diameter of about 48 mm, a height of about 80 mm, and a form factor ratio of about 0.600. The cylindrical secondary battery 100 may have a diameter of about 46 mm, a height of about 80 mm, and a form factor ratio of about 0.575.

In the related art, secondary batteries having a form factor ratio of about 0.4 or less have been used. That is, in the related art, for example, an 18650 cell, a 21700 cell, etc. have been used. The 18650 cell has a diameter of about 18 mm, a height of about 65 mm, and a form factor ratio of about 0.277. The 21700 cell has a diameter of about 21 mm, a height of about 70 mm, and a form factor ratio of about 0.300.

Figure 12:
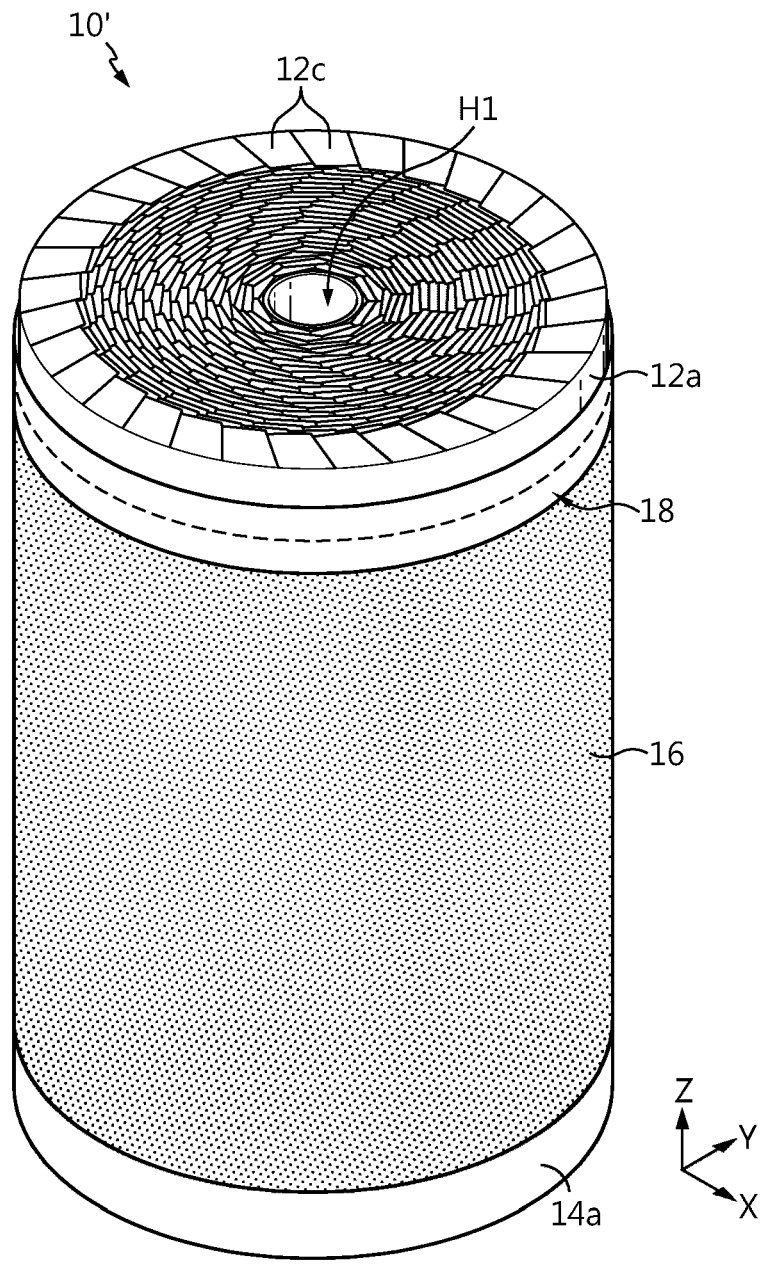
FIG. 12 is a view for explaining an electrode assembly that may be included in a cylindrical secondary battery according to another embodiment of the present disclosure.

FIG. 12 is a view for explaining an electrode assembly that may be included in a cylindrical secondary battery according to another embodiment of the present disclosure. In the description with reference to FIG. 2 above, it is mentioned that each of the uncoated portions 12a, 14a of the electrode assembly 10 of FIG. 1 may be bent toward the winding center C of the electrode assembly 10. FIG. 12 shows a preferred example of an electrode assembly to which such bending is applied.

Referring to FIG. 12, in the positive electrode plate 12 of the electrode assembly 10', at least a partial area of the positive electrode uncoated portion 12a is divided into a plurality of segments 12c. The segment 12c may be notched in a direction along the short side of the positive electrode current collector of the positive electrode plate 12. For example, the segment 12c may be notched by laser. In addition, the segment 12c may be formed by a known metal foil cutting process such as ultrasonic cutting or punching. Each of the plurality of segments 12c may have a rectangular, trapezoidal, triangular, parallel quadrilateral, semicircular or semi-elliptical structure.

The positive electrode uncoated portion 12a may include a core-side uncoated portion adjacent to the winding center of the electrode assembly 10', an outer circumferential uncoated portion adjacent to the outer circumference of the electrode assembly 10', and an intermediate uncoated portion interposed between the core-side uncoated portion and the outer circumferential uncoated portion, and the segment 12c may be formed in the intermediate uncoated portion. Segments may not be formed in the core-side uncoated portion and the outer circumferential uncoated portion. The height (length in the Z-axis direction) of the positive electrode uncoated portion 12a is not uniform and may have a relative difference in the winding direction. For example, the height of the outer circumferential uncoated portion may be relatively smaller than that of the core-side uncoated portion and the intermediate uncoated portion. In addition, the height of the intermediate uncoated portion may have a step shape that gradually increases from the core toward the outer circumference. The width (length in the X direction) of the core-side uncoated portion may be designed by applying the condition that the cavity H1 of the electrode assembly 10' is not covered when the segments 12c of the intermediate uncoated portion are bent toward the core. In this way, by forming the segments 12c and adjusting the height and length of the other uncoated portion in which the segments 12c are not formed, the cavity H1 of the electrode assembly 10' is prevented from being blocked when the positive electrode uncoated portion 12a is bent. Then, the electrolyte injection process and the welding process may be easily performed.

The plurality of segments 12c may be bent toward the core of the electrode assembly 10'. At this time, the plurality of segments 12c may be overlapped in multiple layers along the radial direction of the electrode assembly 10'. If the plurality of segments 12c are formed and bent in this way, there is no risk that the uncoated portion is not properly bent compared to the other case. When the uncoated portion is not properly bent, the separator is exposed between the uncoated portions, and thus there is a problem in that the separator is damaged by a laser having high energy during laser welding.

Meanwhile, at least a partial area of the negative electrode uncoated portion 14a may also be divided into a plurality of segments. All information related to the segments of the negative electrode uncoated portion 14a or bending thereof may be applied as described in the positive electrode uncoated portion 12a.

Figure 13:
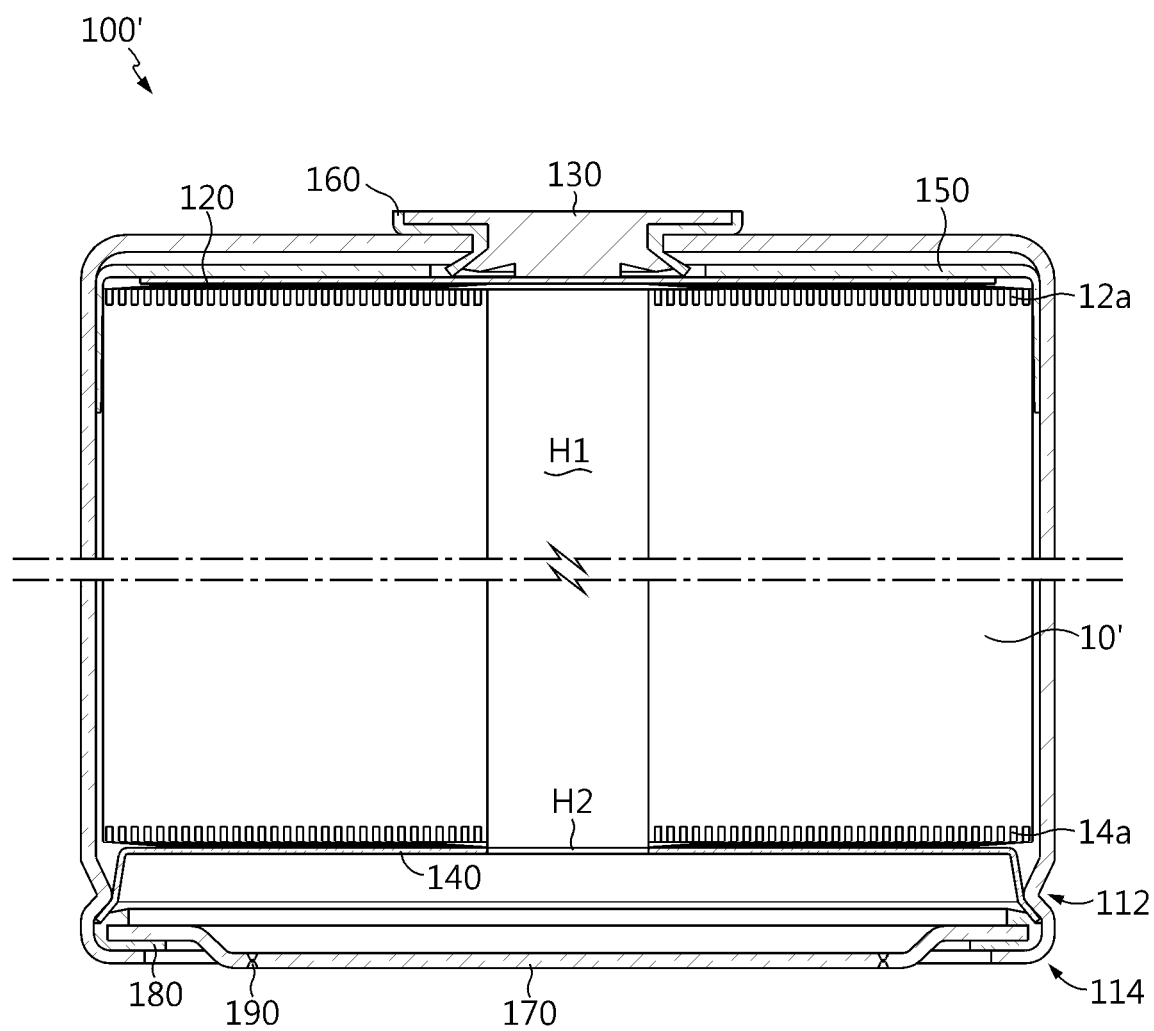
FIG. 13 is a longitudinal cross-sectional view of a cylindrical secondary battery including the electrode assembly of FIG. 12.

FIG. 13 is a longitudinal cross-sectional view of a cylindrical secondary battery including the electrode assembly of FIG. 12.

Referring to FIG. 13, the cylindrical secondary battery 100' is the same as the cylindrical secondary battery 100 of FIG. 11 except that the electrode assembly 10' of FIG. 12 is included. In addition, the cylindrical secondary battery 100' differs only in that reference numeral H2 is assigned to the negative electrode current collector plate hole in the center portion of the negative electrode current collector plate 140.

In the cylindrical secondary battery 100', the positive electrode uncoated portion 12a and the negative electrode uncoated portion 14a have a bent shape. Accordingly, the space occupied by each of the uncoated portions 12a, 14a is reduced, thereby improving energy density. In addition, due to an increase in the coupling area between each of the uncoated portions 12a, 14a and each of the current collector plates 120, 140, the coupling force may be improved and the resistance may be reduced.

Now, various embodiments of the positive electrode current collector plate 120 and the negative electrode current collector plate 140 will be described. In the cylindrical secondary batteries 100, 100', the coupling area S1 between the positive electrode uncoated portion 12a and the positive electrode current collector plate 120 is smaller than the coupling area S2 between the negative electrode uncoated portion 14a and the negative electrode current collector plate 140. When the relationship of S1<S2 is satisfied, the kinetic balance between the positive electrode and the negative electrode may be achieved. The positive electrode current collector plate 120 and the negative electrode current collector plate 140 described below satisfy the relationship of S1<S2.

FIGS. 14 to 17 are views showing various shapes of the positive electrode current collector plate.

Referring to FIGS. 14 to 17, the positive electrode current collector plate 120 includes a rim portion 121, a positive electrode tab coupling portion 122, and a terminal coupling portion 123. The rim portion 121, the positive electrode tab coupling portion 122, and the terminal coupling portion 123 may all be in the same plane. That is, the positive electrode current collector plate 120 is an approximately plate-shaped member whose thickness is smaller than the horizontal or vertical length of the portion having a large area, and when the portion having a large area in the positive electrode current collector plate 120 is placed at the top of the electrode assembly 10, 10', the entire positive electrode current collector plate 120 has a shape extending in parallel with the top surface of the electrode assembly 10, 10'. Also, the heights of the rim portion 121, the positive electrode tab coupling portion 122 and the terminal coupling portion 123 have no difference in the positive electrode current collector plate 120. This planar structure does not occupy a lot of volume in the battery can 110, so space utilization is good.

The rim portion 121 may have a substantially rim shape in which an empty space S is formed in at least a part of the inner region. Although the drawings show only the case in which the rim portion 121 has a substantially circular rim shape, the present disclosure is not limited thereto. The rim portion 121 may have an approximately square rim shape or other shapes unlike the one illustrated.

The positive electrode tab coupling portion 122 extends inward from the rim portion 121 and may be coupled to the positive electrode uncoated portion 12a by welding. The positive electrode tab coupling portion 122 may be regarded as a strip as described above with reference to FIG. 5. The terminal coupling portion 123 is spaced apart from the positive electrode tab coupling portion 122 and is positioned on the inner side of the rim portion 121. The terminal coupling portion 123 may be coupled to the rivet terminal 130 described above by welding. The terminal coupling portion 123 may be located, for example, in the center portion of the inner space of the rim portion 121. The terminal coupling portion 123 may be disposed at a position corresponding to a cavity H1 formed at the winding center of the electrode assembly 10, 10'.

The positive electrode tab coupling portion 122 and the terminal coupling portion 123 are not directly connected, but are disposed to be spaced apart from each other and are electrically connected by the rim portion 121. As such, since the positive electrode current collector plate 120 has a structure in which the positive electrode tab coupling portion 122 and the terminal coupling portion 123 are not directly connected to each other, but connected through the rim portion 121, when shock and/or vibration occurs in the cylindrical secondary battery 100, 100', the shock applied to the coupling area between the positive electrode tab coupling portion 122 and the positive electrode uncoated portion 12a and the coupling area between the terminal coupling portion 123 and the rivet terminal 130 may be distributed. Therefore, the positive electrode current collector plate 120 has the effect of minimizing or preventing damage to the welding region due to the external impact. The positive electrode current collector plate 120 has a structure in which stress can be concentrated on the connection portion of the rim portion 121 and the terminal coupling portion 123 when an external impact is applied. Since the connection portion is not an area in which the welding portion for coupling between components is formed, it is possible to prevent the occurrence of product defects due to the damage of the welding portion caused by the external impact. As such, since the positive electrode current collector plate 120 has a structure that can prevent the force from being concentrated on the coupling area between components even when an external impact and/or vibration is applied during use, the performance of the cylindrical secondary battery 100, 100' including the same is improved.

The positive electrode current collector plate 120 may further include a connection portion 124 extending inward from the rim portion 121 and connected to the terminal coupling portion 123. At least a part of the connection portion 124 may be formed to have a smaller width than that of the positive electrode tab coupling portion 122. In this case, when the electric resistance increases in the connection portion 124 so that a current flows through the connection portion 124, a greater resistance is generated compared to other portions, and when an overcurrent occurs as a result, a part of the connection portion 124 may rupture to block the overcurrent. The width of the connection portion 124 may be adjusted to an appropriate level in consideration of such an overcurrent blocking function. At least a part of the connection portion 124 may be relatively narrow in width to enhance the current blocking function.

The connection portion 124 may include a tapered portion 124a whose width is gradually narrowed from the inner surface of the rim portion 121 toward the terminal coupling portion 123. When the tapered portion 124a is included, the rigidity of the component may be improved at the connection portion between the connection portion 124 and the rim portion 121.

A plurality of positive electrode tab coupling portions 122 may be included in the positive electrode current collector plate 120. The plurality of positive electrode tab coupling portions 122 may be disposed at equal intervals from each other along the circumferential direction. The plurality of positive electrode tab coupling portions 122 may have the same extended length as each other. The terminal coupling portion 123 may be disposed to be surrounded by the plurality of positive electrode tab coupling portions 122. The connection portion 124 may be positioned between a pair of positive electrode tab coupling portions 122 adjacent to each other. In this case, the distance from the connection portion 124 to any one of the pair of positive electrode tab coupling portions 122 along the rim portion 121 may be equal to the distance from the connection portion 124 to the other one of the pair of positive electrode tab coupling portions 122 along the rim portion 121.

A plurality of connection portions 124 may be included. Each of the plurality of connection portions 124 may be disposed between the pair of positive electrode tab coupling portions 122 adjacent to each other. The plurality of connection portions 124 may be disposed at equal intervals from each other along the circumferential direction.

As described above, in the case in which a plurality of positive electrode tab coupling portions 122 and/or connection portions 124 are included, if the distance between the positive electrode tab coupling portions 122 and/or the distance between the connection portions 124 and/or the distance between the positive electrode tab coupling portion 122 and the connection portion 124 is uniformly formed, a current flowing from the positive electrode tab coupling portion 122 toward the connection portion 124 or a current flowing from the connection portion 124 toward the positive electrode tab coupling portion 122 may be smoothly formed.

In a state where the positive electrode tab coupling portion 122 is seated on the bent surface of the positive electrode uncoated portion 12a in the electrode assembly 10', welding may be performed on a predetermined region. That is, the positive electrode tab coupling portion 122 may be coupled to a region in which a plurality of segments 12c (FIG. 12) overlap in multiple layers. The positive electrode welding portion may be formed for each of the positive electrode tab coupling portions 122. A coupling area S1 between the positive electrode uncoated portion 12a and the positive electrode current collector plate 120 is secured in the positive electrode tab coupling portion 122 through the positive electrode welding portion. The positive electrode welding portion may be formed to extend along an extension direction of the positive electrode tab coupling portion 122.

Figure 14:
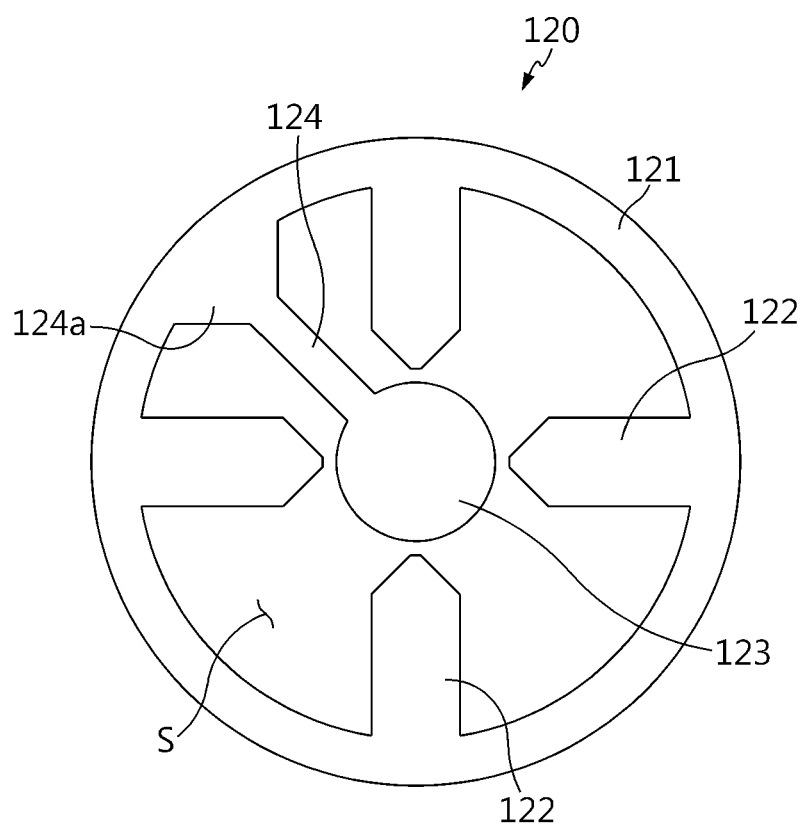
FIGS. 14 to 17 are views showing various types of positive electrode current collector plates.
Figure 15:
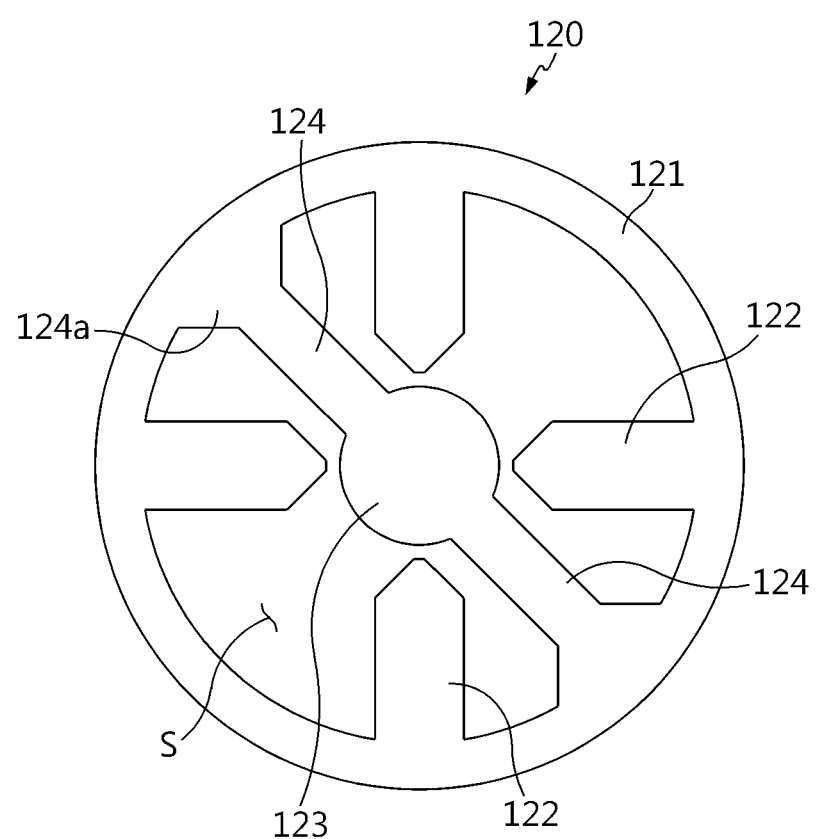
Figure 16:
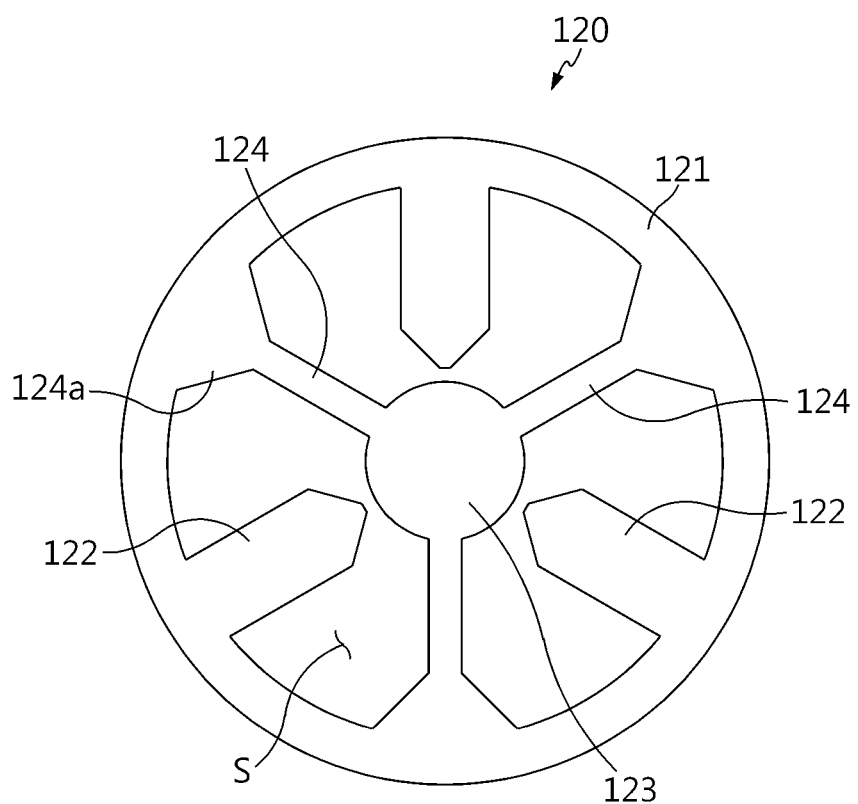
Figure 17:
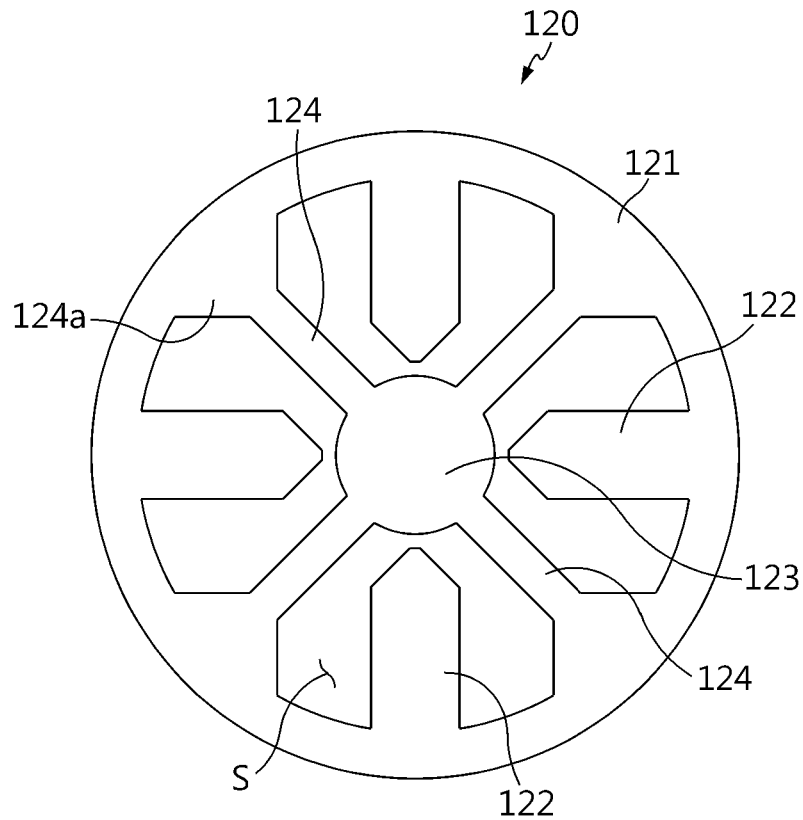

In FIGS. 14, 15 and 17, the number of positive electrode tab coupling portions 122 is four, and in FIG. 16, the number of positive electrode tab coupling portions 122 is three. The number of positive electrode tab coupling portions 122 may vary, and by adjusting the number of positive electrode tab coupling portions 122 and the number and area of positive electrode welding portions, the coupling area S1 between the positive electrode uncoated portion 12a and the positive electrode current collector plate 120 may be changed FIGS. 18 to 25 are views showing various types of negative electrode current collector plates.

First, referring to FIGS. 18 to 21, the negative electrode current collector plate 140 includes at least one negative electrode tab coupling portion 142 coupled to the negative electrode uncoated portion 14a and at least one can coupling portion 143 extending from the negative electrode tab coupling portion 142 and electrically coupled to the beading part 112 on the inner surface of the battery can 110. The negative electrode tab coupling portion 142 and the can coupling portion 143 may not be in the same plane. That is, the negative electrode current collector plate 140 is an approximately plate-shaped member whose thickness is smaller than the horizontal or vertical length of the portion having a large area, and when the portion having a large area in the negative electrode current collector plate 140 is placed on the bottom of the electrode assembly 10, 10', there is a difference in height between the negative electrode tab coupling portion 142 and the can coupling portion 143 in the negative electrode current collector plate 140. This three-dimensional structure secures the contact area between the negative electrode tab coupling portion 142 and the negative electrode uncoated portion 14a, while raising the can coupling portion 143 to be fixed to the beading part 112 of the battery can 110, so that the bonding strength of the coupling area with the battery can 110 may be improved.

The center portion 141 of the negative electrode current collector plate 140 may have a substantially circular plate shape. The center portion 141 may optionally be coupled with the negative electrode uncoated portion 14a. The center portion 141 may have a ring-shaped plate shape having a negative electrode current collector plate hole H2 provided at its center.

The negative electrode current collector plate hole H2 may be formed at a position corresponding to the cavity H1 of the electrode assembly 10, 10' and may be circular. The cavity H1 and the negative electrode current collector plate hole H2 communicating with each other may function as a passage for inserting a welding rod or irradiating a laser welding beam for welding between the rivet terminal 130 and the positive electrode current collector plate 120.

The diameter of the negative electrode current collector plate hole H2 may be identical to or greater than the diameter of the cavity H1 of the electrode assembly 10'. Preferably, if the diameter of the negative electrode current collector plate hole H2 is set to be greater than the diameter of the cavity H1 of the electrode assembly 10', when inserting a welding rod or irradiating a laser welding beam for welding between the rivet terminal 130 and the positive electrode current collector plate 120, it becomes easier to secure a space according to the insertion of the welding guide.

The center portion 141 and the negative electrode tab coupling portion 142 are disposed below the electrode assemblies 10, 10', and may be located above the beading part 112 when the beading part 112 is formed in the battery can 110.

The negative electrode current collector plate 140 may have at least one leg structure extending along the radial direction in a state in which the negative electrode tab coupling portion 142 and the can coupling portion 143 are interconnected. Preferably, a plurality of leg structures may be included. For example, referring to FIGS. 18 to 20, the negative electrode current collector plate 140 may have four leg structures. Referring to FIG. 21, the negative electrode current collector plate 140 may have six leg structures. If a plurality of leg structures are provided in this way, a plurality of can coupling portions 143 may also be provided. At this time, although not shown in the drawing, the plurality of can coupling portions 143 may be connected to each other to be integrally formed.

The negative electrode tab coupling portion 142 may have a shape extending approximately radially from the center portion 141 of the negative electrode current collector plate 140 toward the sidewall of the battery can 110. A plurality of negative electrode tab coupling portions 142 may be provided. The plurality of negative electrode tab coupling portions 142 may be positioned to be spaced apart from each other along the circumference of the center portion 141. The negative electrode tab coupling portion 142 may also be regarded as a strip as described with reference to FIG. 5. By providing the plurality of negative electrode tab coupling portions 142, the coupling area with the negative electrode uncoated portion 14a may be increased. Accordingly, the coupling force between the negative electrode uncoated portion 14a and the negative electrode tab coupling portion 142 may be secured and electrical resistance may be reduced.

The negative electrode tab coupling portion 142 may be coupled to the negative electrode uncoated portion 14a by welding. In a state where the negative electrode tab coupling portion 142 is seated on the bent surface of the negative electrode uncoated portion 14a in the electrode assembly 10', welding may be performed on a predetermined region. That is, the negative electrode tab coupling portion 142 may be coupled to a region in which a plurality of segments are overlapped in multiple layers. A negative electrode welding portion may be formed for each negative electrode tab coupling portion 142. The coupling area S2 between the negative electrode uncoated portion 14a and the negative electrode current collector plate 140 is secured to the negative electrode tab coupling portion 142 through the negative electrode welding portion. The negative electrode welding portion may be formed to extend along the extending direction of the negative electrode tab coupling portion 142.

The longitudinal end of the negative electrode tab coupling portion 142 may be located more inner than the innermost point of the beading part 112 formed in the battery can 110. More specifically, the boundary region between the negative electrode tab coupling portion 142 and the can coupling portion 143 may be located more inner than the innermost point of the beading part 112 formed in the battery can 110 in the direction toward the cavity H1 of the electrode assemblies 10, 10'. According to such a structure, it is possible to prevent damage to the coupling portion between components that may occur as the negative electrode current collector plate 140 is excessively bent to position the end of the can coupling portion 143 on the beading part 112.

The can coupling portion 143 may extend from an end of the negative electrode tab coupling portion 142 to be coupled to the beading part 112 on the inner surface of the battery can 110. For example, the can coupling portion 143 may extend from the end of the negative electrode tab coupling portion 142 toward the sidewall of the battery can 110. For example, a plurality of can coupling portions 143 may be provided. The plurality of can coupling portions 143 may be spaced apart from each other along the circumference of the center portion 141. As shown in FIGS. 11 and 13, the plurality of can coupling portions 143 may be coupled to the beading part 112 on the inner surface of the battery can 110. In addition, by the structure in which the negative electrode current collector plate 140 is coupled to the beading part 112 of the battery can 110 as above rather than the inner surface of the cylindrical part of the battery can 110, the distance between the negative electrode current collector plate 140 and the beading part 112 may be reduced. Accordingly, the dead space inside the battery can 110 is minimized, so that the energy density of the cylindrical secondary battery 100, 100' may be improved.

The can coupling portion 143 may be compressed and fixed by the crimping part 114 of the battery can 110. The can coupling portion 143 may include a contact portion 143a coupled to the beading part 112 on the inner surface of the battery can 110 and a connection portion 143b connecting the negative electrode tab coupling portion 142 to the contact portion 143a.

The contact portion 143a is coupled on the inner surface of the battery can 110. In the case where the beading part 112 is formed in the battery can 110, the contact portion 143a may be coupled onto the beading part 112. In this case, as described above, for stable contact and coupling, both the beading part 112 and the contact portion 143a may extend in a direction approximately parallel to the lower surface of the battery can 110, that is, in a direction approximately perpendicular to the sidewall of the battery can 110. That is, the contact portion 143a includes at least a part of a flat portion substantially parallel to the lower surface of the battery can 110.

Figure 18:
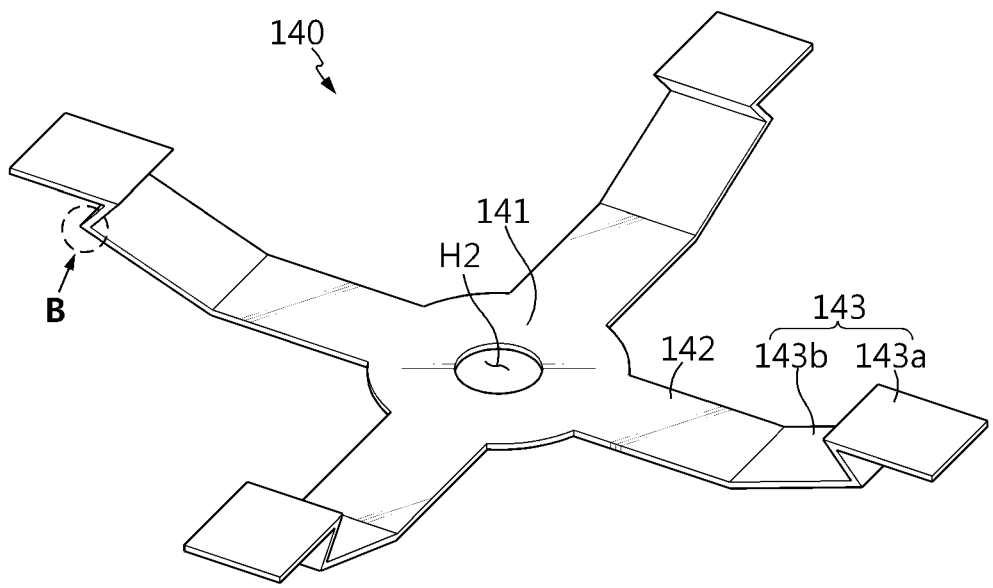
FIGS. 18 to 25 are views showing various types of negative electrode current collector plates.

As indicated in FIG. 18, the connection portion 143b may include at least one bending portion B whose extension direction is switched between the center portion 141 and the contact portion 143a at least once. That is, the connection portion 143b may have a retractable and stretchable structure within a certain range, for example, a spring-like structure or a bellows-like structure. Meanwhile, the connection portion 143b may be elastically biased upward by the bending portion B. Although the structure of the connection portion 143b has a height distribution of the electrode assembly 10, 10' within a certain range, in the process of accommodating the electrode assembly 10, 10' coupled with the negative electrode current collector plate 140 in the battery can 110, the contact portion 143a may be in close contact onto the beading part 112. In addition, according to the structure of the connection portion 143b, the shape may be more stably implemented during the sizing process. The sizing process is a compression process for reducing the height occupied by the beading part 112 of the battery can 110 in order to reduce the total height of the cylindrical secondary battery 100, 100' in manufacturing the cylindrical secondary battery 100, 100'. In addition, the retractable and stretchable structure of the connection portion 143b alleviates the shock caused by the movement of the electrode assembly 10, 10' within a certain range even if vibration and/or impact occurs during use of the cylindrical secondary battery 100, 100' so to move the electrode assembly 10, 10' up and down.

The shapes of the contact portion 143a and the connection portion 143b may be variously changed. The negative electrode current collector plate 140 of FIG. 18 and the negative electrode current collector plate 140 of FIG. 19 differ only in the shape of the contact portion 143a, and the structure of the negative electrode current collector plate 140 described above may be substantially identically applied to other parts.

Figure 19:
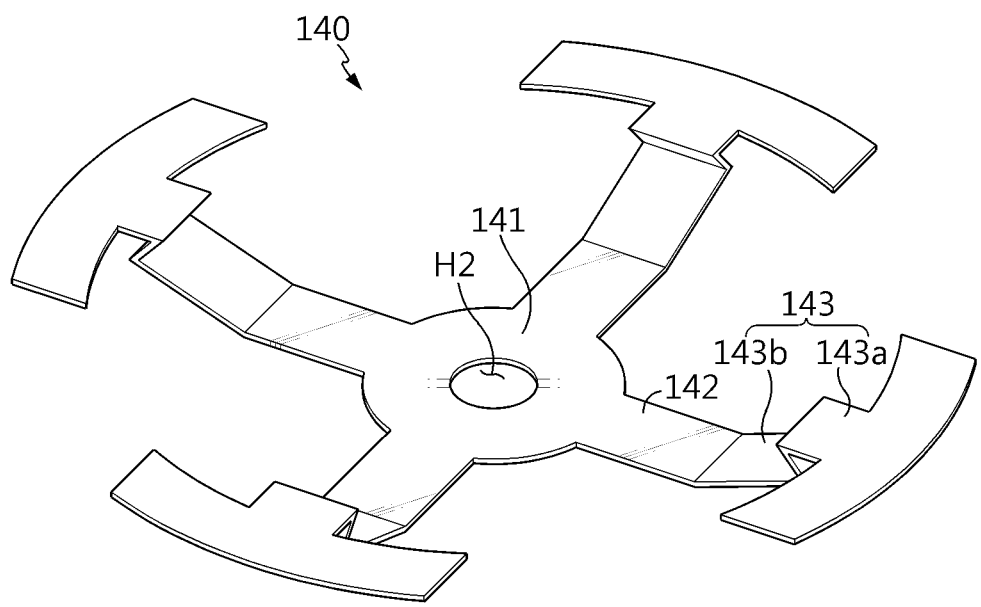

Referring to FIG. 19, at least a part of the contact portion 143a may have a shape extending along the inner circumference of the battery can 110. For example, the contact portion 143a may have an arc shape extending along the beading part of the battery can 110. In addition, although not shown in the drawings, in order to maximize the contact area, in the negative electrode current collector plate 140, the sum of the extended lengths of the contact portions 143a of the at least one can coupling portion 143 may be approximately the same as the inner circumference of the battery can 110. In such an embodiment, it is possible to provide the effect of improving the coupling force and reducing the electrical resistance due to the maximization of the coupling area.

Figure 20:
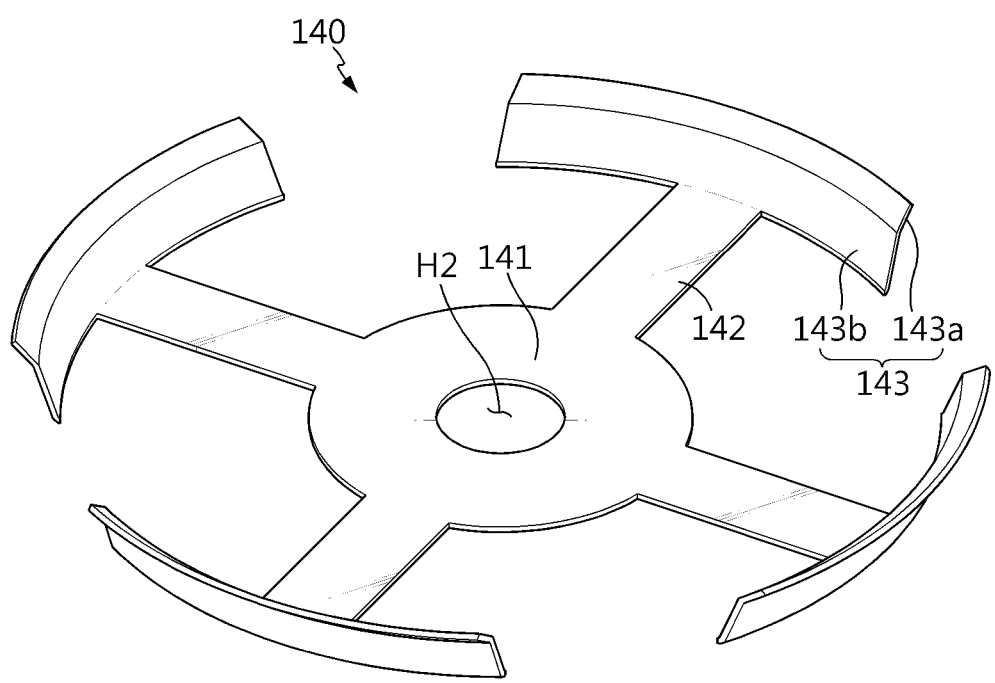
Figure 21:
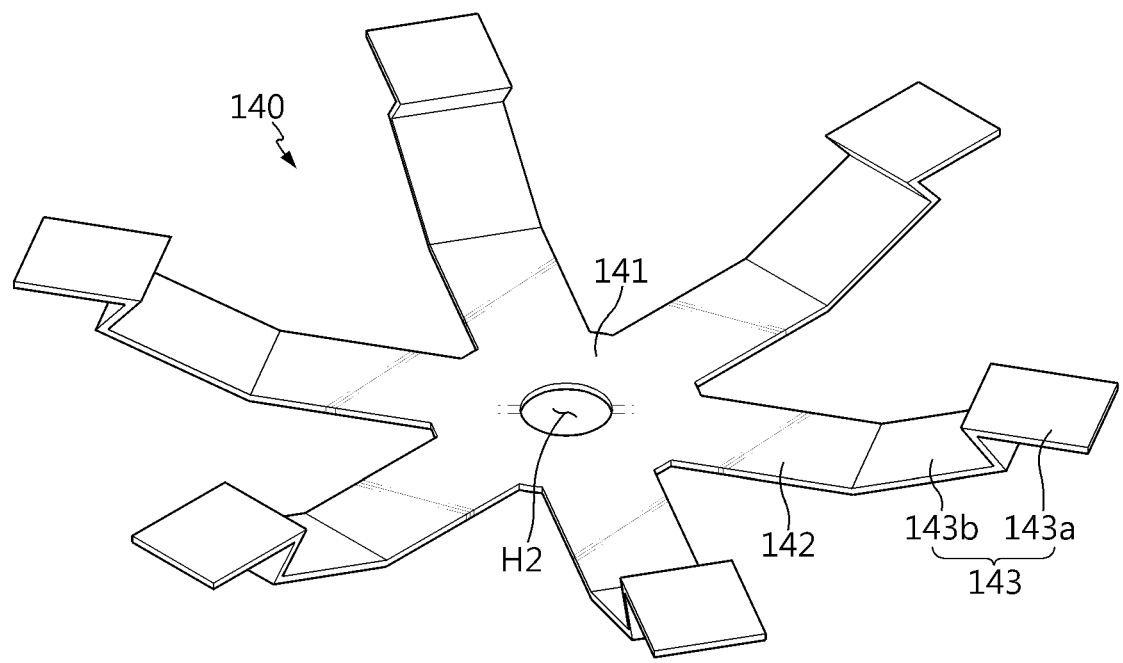

Next, referring to FIG. 20, the negative electrode current collector plate 140 of FIG. 20 is different from the negative electrode current collector plate 140 of FIG. 19 only in the shape of the contact portion 143a and the connection portion 143b, and otherwise, the structure of the negative electrode current collector plate 140 described above may be applied substantially in the same way.

Referring to FIG. 20, at least a part of the connection portion 143b may extend along the inner circumference of the battery can 110. Specifically, the contact portion 143a may have an arc shape extending along the beading part of the battery can 110, and the connection portion 143b may have an arc shape extending along the contact portion 143a. According to this structure, since the area of the negative electrode current collector plate 140 is additionally increased compared to the negative electrode current collector plate 140 shown in FIG. 20, the effect of reducing the electrical resistance may be maximized.

As in FIGS. 18, 19 and 21, the connection portion between the contact portion 143a and the connection portion 143b may be bent. Alternatively, as shown in FIG. 20, the connection portion between the contact portion 143a and the connection portion 143b may have a complementary shape corresponding to the inner surface of the beading part 112. In particular, the connection portion between the contact portion 143a and the connection portion 143b may be seamlessly coupled with the beading part 112 while having a shape matching the inner surface of the beading part 112. According to such a structure, the beading part 112 may effectively support the negative electrode current collector plate 140. In addition, according to such a structure, unnecessary interference between the beading part 112 and the connection portion 143b may be prevented. Therefore, the stable coupling between the contact portion 143a and the beading part 112 may be effectively maintained.

Meanwhile, referring to FIG. 20, the negative electrode current collector plate 140 may not include the bending portion B, unlike the negative electrode current collector plate 140 illustrated in FIGS. 18, 19 and 21. If the bending portion B is not provided as above, raw materials required for manufacturing the negative electrode current collector plate 140 may be reduced. Accordingly, it is possible to save the manufacturing cost of the negative electrode current collector plate 140.

Meanwhile, the contact portion 143a may be interposed and fixed between the beading part 112 of the battery can 110 and the sealing gasket 180. That is, in a state where the contact portion 143a is interposed between the beading part 112 of the battery can 110 and the sealing gasket 180, the contact portion 143a may be fixed due to the crimping force of the crimping part 114.

According to one embodiment of the present disclosure, the circumferential length of the contact portion 143a may be identical to the circumferential length of the negative electrode tab coupling portion 142. In addition, the circumferential length of the contact portion 143a may be identical to the circumferential length of the connection portion 143b. For example, referring to FIGS. 18 and 21, it may be seen that the negative electrode tab coupling portion 142, the connection portion 143b and the contact portion 143a extend to the same width.

According to another embodiment of the present disclosure, the circumferential length of the contact portion 143a may be formed to be relatively longer than the circumferential length of the negative electrode tab coupling portion 142. Also, preferably, the circumferential length of the contact portion 143a may be formed to be relatively longer than the circumferential length of the connection portion 143b. For example, referring to FIGS. 19 and 20, it can be seen that the circumferential length of the contact portion 143a is relatively longer than the circumferential length of the negative electrode tab coupling portion 142. Also, referring to FIG. 19, it can be seen that the circumferential length of the contact portion 143a is relatively longer than the circumferential length of the connection portion 143b. By forming the contact portion 143a to have a long circumferential length in this way, the coupling force of the negative electrode current collector plate 140 with the beading part 112 may be improved. Furthermore, the internal resistance of the battery can be reduced by making the circumferential length of the contact portion 143a and/or the connection portion 143b longer.

In FIGS. 18 to 20, the number of negative electrode tab coupling portions 142 is four, and in FIG. 21, the number of negative electrode tab coupling portions 142 is six. The number of negative electrode tab coupling portions 142 in the negative electrode current collector plate 140 may vary, and by adjusting the number of negative electrode tab coupling portions 142 and the number and area of negative electrode welding portions, the coupling area S2 between the negative electrode uncoated portion 14a and the negative electrode tab coupling portions 142 may be changed.

The cylindrical secondary batteries 100, 100' may be implemented by various combinations of the positive electrode current collector plate 120 exemplified in FIGS. 14 to 17 and the negative electrode current collector plate 140 exemplified in FIGS. 18 to 21.

In each current collector plate, the area of one welding portion may be the same and the number of welding portions formed on the positive electrode current collector plate 120 may be reduced so that the coupling area S1 between the positive electrode uncoated portion 12a and the positive electrode current collector plate 120 is smaller than the coupling area S2 between the negative electrode uncoated portion 14a and the negative electrode current collector plate 140. When the positive electrode welding portion is formed for each positive electrode tab coupling portion 122 and the negative electrode welding portion is formed for each negative electrode tab coupling portion 142, the number of positive electrode tab coupling portions 122 may be smaller than the number of negative electrode tab coupling portions 142 to satisfy this condition. Therefore, the number of negative electrode tab coupling portions 142 of the negative electrode current collector plate 140 may be M, and the number of positive electrode tab coupling portions 122 of the positive electrode current collector plate 120 may be 1 to M−1 (M is a natural number greater than or equal to 2). In this case, the ratio (S1/S2) of an appropriate coupling area between the positive electrode current collector plate and the negative electrode current collector plate may be adjusted within the range of 1/M to (M−1)/M.

The welding process on the positive electrode current collector plate 120 and the welding process on the negative electrode current collector plate 140 may apply the same set conditions such as laser power, irradiation time, and irradiation speed, and when the same conditions are applied, it is easier in terms of process control compared to the case where the same conditions are not applied. In such a case, the area of one positive electrode welding portion and the area of one negative electrode welding portion are formed to be the same. Therefore, it is preferable to adjust the welding area by adjusting the number of positive electrode welding portions and the number of negative electrode welding portions while applying the welding process conditions on the positive electrode current collector plate 120 and the welding process conditions on the negative electrode current collector plate 140 in the same way. In addition, it is preferable in terms of resistance to form a positive electrode welding portion on every positive electrode tab coupling portion 122 and form a negative electrode welding portion on every negative electrode tab coupling portion 142. Accordingly, it is a preferred embodiment to adjust the welding area by making the number of positive electrode tab coupling portions 122 smaller than the number of negative electrode tab coupling portions 142.

For example, a combination of the positive electrode current collector plate 120 having four positive electrode tab coupling portions 122 as exemplified in FIGS. 14 to 17 and the negative electrode current collector plate 140 having six negative electrode tab coupling portions 142 as exemplified in FIG. 21 may be used. As another example, a combination of the positive electrode current collector plate 120 having three positive electrode tab coupling portions 122 shown in FIG. 16 and the negative electrode current collector plate 140 having four negative electrode tab coupling portions 142 shown in FIGS. 18 to 21 may be used.

Of course, as another example, in order to make the coupling area S1 between the positive electrode uncoated portion 12a and the positive electrode current collector plate 120 smaller than the coupling area S2 between the negative electrode uncoated portion 14a and the negative electrode current collector plate 140, it may be possible to make the area of one welding portion formed on the positive electrode current collector plate 120 smaller, even though the number of welding portions in each current collector plate is the same.

Next, referring to FIGS. 22 to 25, a negative electrode current collector plate 140 modified as compared with the negative electrode current collector plate 140 shown in FIGS. 18 to 21 is shown.

Figure 22:
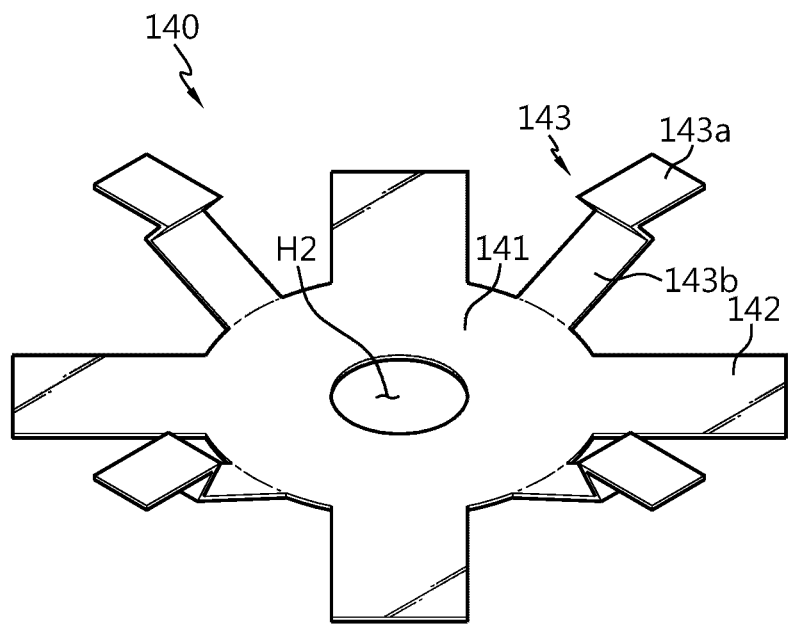

Referring to FIG. 22, the negative electrode current collector plate 140 of FIG. 22 has a difference only in that the negative electrode tab coupling portion 142 and the can coupling portion 143 are not directly connected to each other, compared to the negative electrode current collector plate 140 of FIG. 18 in which the can coupling portion 143 extends from the negative electrode tab coupling portion 142, and otherwise, the structure of the negative electrode current collector plate 140 described above may be applied substantially in the same way.

In the negative electrode current collector plate 140 of FIG. 22, the negative electrode tab coupling portion 142 and the can coupling portion 143 are indirectly connected through the center portion 141 and are not directly connected to each other. Therefore, when an external impact is applied to the cylindrical secondary batteries 100, 100' of the present disclosure, the possibility of damage to the coupling portion of the negative electrode current collector plate 140' and the electrode assembly 10, 10' and the coupling portion of the negative electrode current collector plate 140' and the battery can 110 may be minimized.

Figure 23:
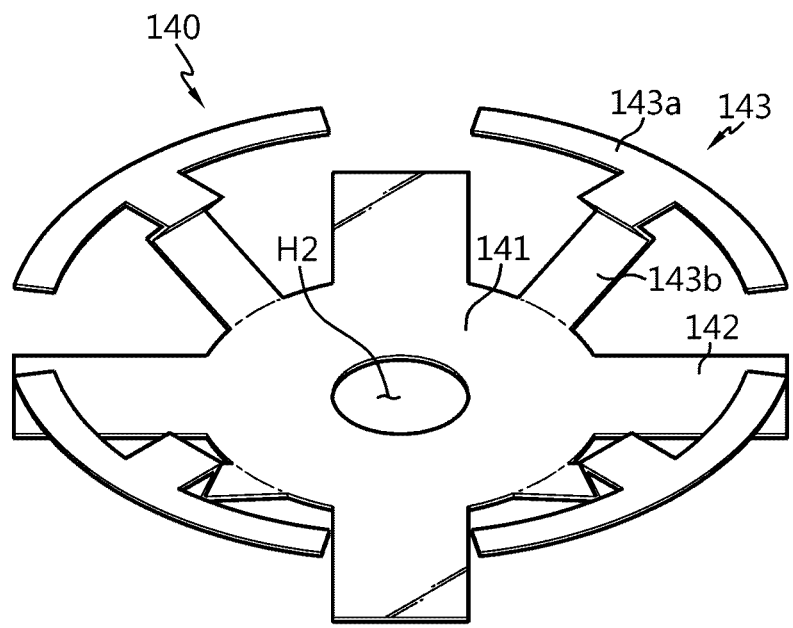

Next, referring to FIG. 23, the negative electrode current collector plate 140 of FIG. 23 is different from the negative electrode current collector plate 140 previously described with reference to FIG. 22 just in the shape of the contact portion 143a, and otherwise, the structure of the negative electrode current collector plate 140 of FIGS. 18 and 22 described above may be applied substantially in the same way. In addition, the contact portion 143a of the negative electrode current collector plate 140 of FIG. 23 has a shape extending along the inner circumference of the battery can 110, and the description of the negative electrode current collector plate 140 with reference to FIG. 19 is applied thereto in the same way.

Figure 24:
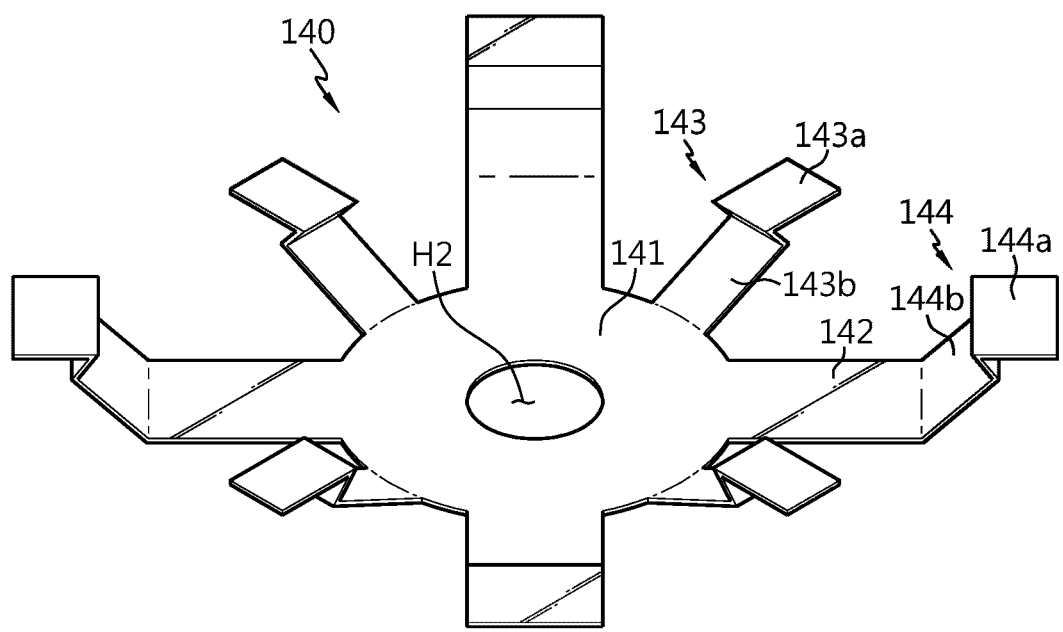

Referring to FIG. 24, the negative electrode current collector plate 140 of FIG. 24 is different from the negative electrode current collector plate 140 previously described with reference to FIG. 22 in that it further includes an additional can coupling portion 144, and the structure of the negative electrode current collector plate 140 of FIGS. 18 and 22 described above may be applied substantially identically.

The additional can coupling portion 144 extends from an end of the negative electrode tab coupling portion 142 and is coupled on an inner surface of the battery can 110. Such an additional can coupling portion 144 is provided to an end of at least one of the plurality of negative electrode tab coupling portions 142. The additional can coupling portion 144 includes an additional contact portion 144*a* coupled onto the inner surface of the battery can 110 and an additional connection portion 144*b* connecting the end of the negative electrode tab coupling portion 142 to the additional contact portion 144*a*.

The additional contact portion 144*a* is coupled onto the inner surface of the battery can 110. In the case where the beading part 112 is formed on the battery can 110, the additional contact portion 144*a* may be coupled onto the beading part 112, like the contact portion 143*a*. In addition, like the shape of the contact portion 143*a* shown in FIG. 23, at least a part of the additional contact portion 144*a* may also have a shape extending along the inner circumference of the battery can 110.

The additional connection portion 144*b* may include at least one bending portion whose extension direction is switched at least once between the negative electrode tab coupling portion 142 and the additional contact portion 144*a*, similarly to the connection portion 143*b* described with reference to FIG. 18 above. Due to the formation of the bending portion, the additional connection portion 144*b* has a retractable and stretchable structure, and thus has an advantage in the assembly process of the cylindrical secondary battery 100, 100' and a buffering effect, as described above.

Figure 25:
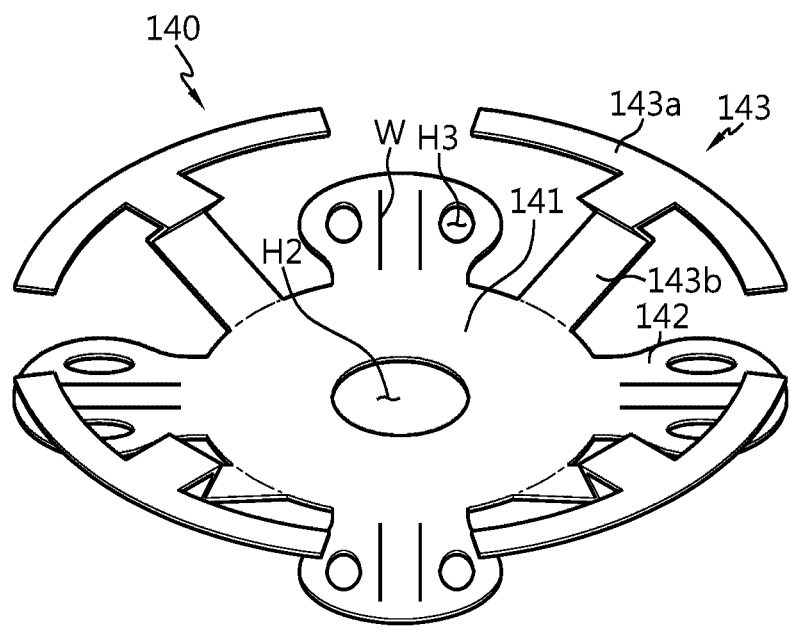

Referring to FIG. 25, the negative electrode current collector plate 140 may include at least one injection hole H3. The injection hole H3 may be provided in, for example, the negative electrode tab coupling portion 142. When a plurality of negative electrode tab coupling portions 142 are provided, an injection hole H3 may be provided in at least one negative electrode tab coupling portion 142. The injection hole H3 may be provided, for example, in one side of the negative electrode welding portion W formed on the negative electrode tab coupling portion 142 or provided in both sides. In manufacturing the cylindrical secondary battery 100, 100', the electrolyte may be injected after the assembly including the electrode assembly 10, 10' and the negative electrode current collector plate 140 is accommodated in the battery can 110. At this time, the injectability may be improved due to the injection hole H3.

A plurality of injection holes H3 may be provided. The plurality of injection holes H3 may be disposed to be substantially symmetrical left and right with respect to the center portion of the negative electrode tab coupling portion 142 in the width direction. A negative electrode welding portion W for coupling the negative electrode tab coupling portion 142 and the negative electrode uncoated portion 14*a* may be formed between the injection holes H3 arranged to be substantially symmetrical left and right.

The negative electrode tab coupling portion 142 may be formed to have a greater width at a location spaced apart from the connection portion toward the longitudinal end of the tab coupling portion by a predetermined distance, than a width at the connection portion between the negative electrode tab coupling portion 142 and the center portion 141. At least a part of the region in which the injection hole H3 is formed may be included in the area that is increased as the width is increased at a location spaced apart from the connection portion toward the end of the negative electrode tab coupling portion 142 by a predetermined distance, compared to the width at the connection portion between the negative electrode tab coupling portion 142 and the center portion 141. On the other hand, the longitudinal end of the negative electrode tab coupling portion 142 may have an approximately arc shape to correspond to the inner circumference of the battery can 110. In addition, as for the description of the structure of the negative electrode current collector plate 140 of FIG. 25, the description of the negative electrode current collector plate 140 previously described with reference to FIGS. 18, 19, 22, 23, or the like may be applied identically.

The cylindrical secondary batteries 100, 100' may be implemented by various combinations of the positive electrode current collector plate 120 exemplified in FIGS. 14 to 17 and the negative electrode current collector plate 140 exemplified in FIGS. 22 to 25.

In each current collector plate, the area of one welding portion may be the same and the number of welding portions formed on the positive electrode current collector plate 120 may be reduced so that the coupling area S1 between the positive electrode uncoated portion 12*a* and the positive electrode current collector plate 120 is smaller than the coupling area S2 between the negative electrode uncoated portion 14*a* and the negative electrode current collector plate 140. When the positive electrode welding portion is formed for each positive electrode tab coupling portion 122 and the negative electrode welding portion is formed for each negative electrode tab coupling portion 142, the number of positive electrode tab coupling portions 122 may be smaller than the number of negative electrode tab coupling portions 142, thereby satisfying this condition.

For example, a combination of the positive electrode current collector plate 120 having three positive electrode tab coupling portions 122 as shown in FIG. 16 and the negative electrode current collector plate 140 having four negative electrode tab coupling portions 142 as shown in FIGS. 22 to 25 may be used.

Figure 26:
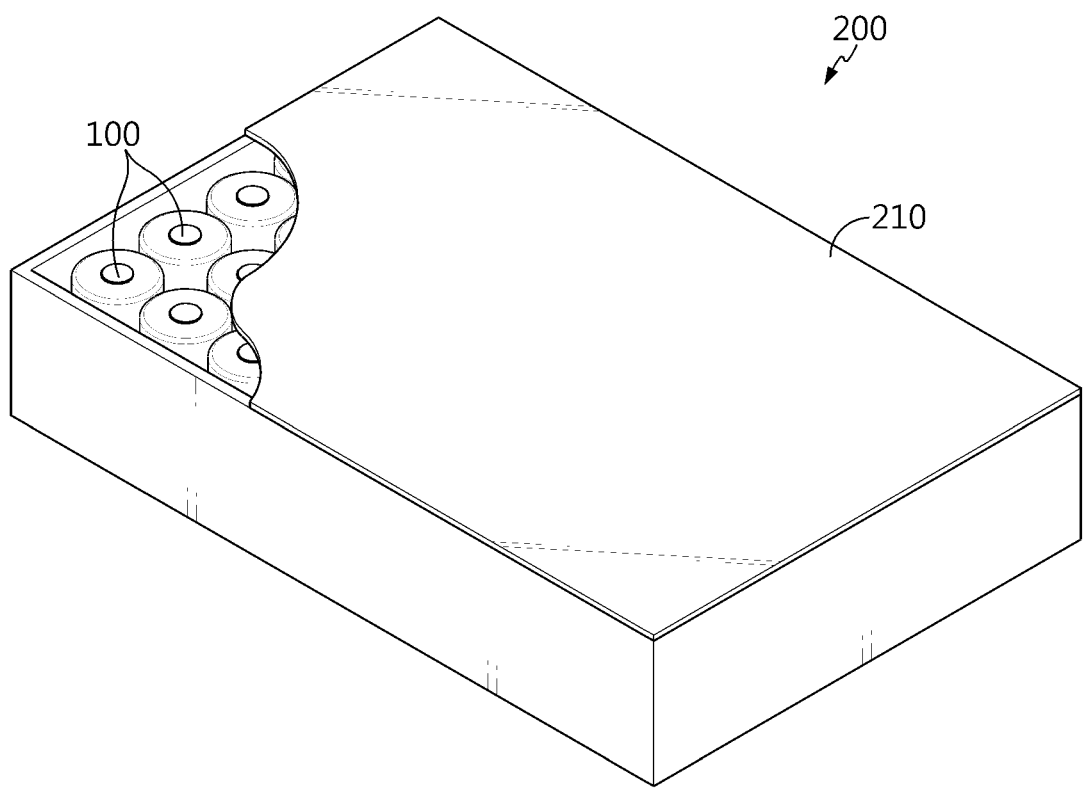
FIG. 26 is a schematic diagram showing a battery pack according to an embodiment of the present disclosure.

Referring to FIG. 26, a battery pack 200 according to an embodiment of the present disclosure includes a secondary battery assembly in which a plurality of cylindrical secondary batteries 100 according to an embodiment of the present disclosure as described above are electrically connected, and a pack housing 210 accommodating the same. In the drawings of the present disclosure, components such as a bus bar for electrical connection, a cooling unit, and a power terminal are omitted for convenience of illustration.

Figure 27:
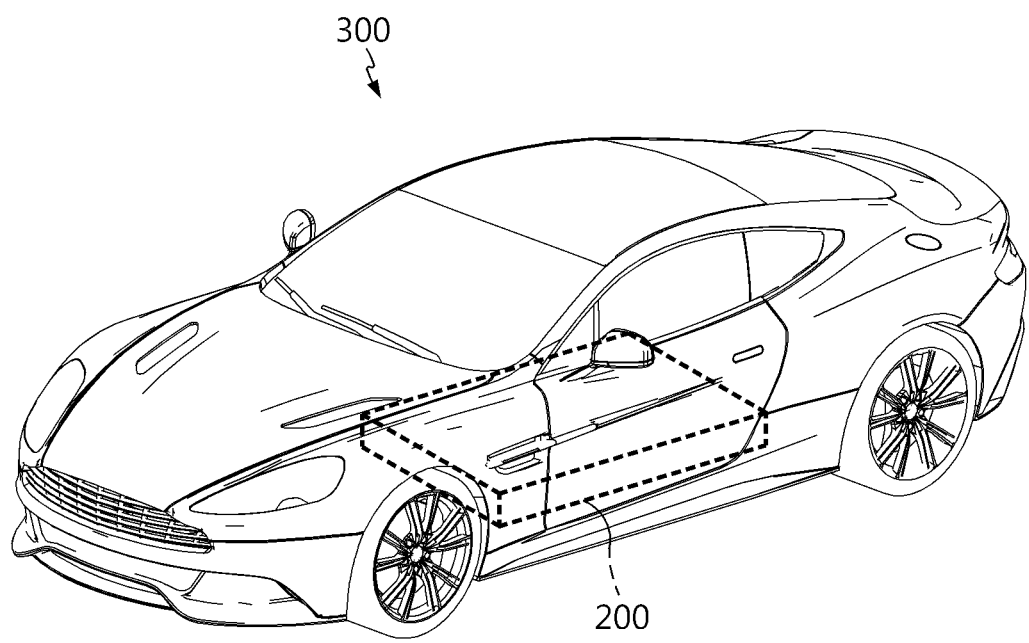
FIG. 27 is a diagram showing a vehicle according to an embodiment of the present disclosure.

Referring to FIG. 27, a vehicle 300 according to an embodiment of the present disclosure may be, for example, an electric vehicle, a hybrid electric vehicle, or a plug-in hybrid electric vehicle, and includes the battery pack 200 according to an embodiment of the present disclosure. The vehicle 300 includes a four-wheeled vehicle and a two-wheeled vehicle. The vehicle 300 operates using the power supplied from the battery pack 200 according to an embodiment of the present disclosure.

Although the present disclosure has been described with regard to a limited number of embodiments and drawings, the present disclosure is not limited thereto, and it is obvious to those skilled in the art that various changes and modifications may be made thereto within the technical aspect of the present disclosure and the appended claims and equivalents thereof.

REFERENCE SIGNS

10, 10': electrode assembly
12: positive electrode plate

14: negative electrode plate
16: separator
12a: positive electrode uncoated portion
12b: positive electrode active material layer
12c: segment
14a: negative electrode uncoated portion
14b: negative electrode active material layer
20, 100, 100': cylindrical secondary battery
22, 120: positive electrode current collector plate
22a: positive electrode welding portion
22b, 24b: strip
24, 140: negative electrode current collector plate
24a: negative electrode welding portion
110: battery can
112: beading part
114: crimping part
121: rim portion
122: positive electrode tab coupling portion
123: terminal coupling portion
130: rivet terminal
142: negative electrode tab coupling portion
143: can coupling portion
143a: contact portion
143b: connection portion
150: insulator
160: insulating gasket
170: cap plate
180: sealing gasket
190: venting portion
H1: cavity
H2: negative electrode current collector plate hole
200: battery pack
300: vehicle

What is claimed is:

1. A cylindrical secondary battery comprising:
an electrode assembly having a positive electrode having a sheet shape, a negative electrode having a sheet shape, and a separator located between the positive electrode and the negative electrode, the positive electrode, the negative electrode, and the separator being wound in a winding direction, the positive electrode including a positive electrode uncoated portion exposed beyond the separator at a long side end, the negative electrode including a negative electrode uncoated portion exposed beyond the separator at a long side end;
a positive electrode current collector plate coupled to the positive electrode uncoated portion by one or more positive electrode welding portions; and
a negative electrode current collector plate coupled to the negative electrode uncoated portion by one or more negative electrode welding portions,
wherein a coupling area between the positive electrode uncoated portion and the positive electrode current collector plate is smaller than a coupling area between the negative electrode uncoated portion and the negative electrode current collector plate.

2. The cylindrical secondary battery according to claim 1, wherein a number of the negative electrode welding portions is greater than a number of the positive electrode welding portions.

3. The cylindrical secondary battery according to claim 1, wherein the positive electrode current collector plate covers a top of the electrode assembly, and
wherein the negative electrode current collector plate covers a bottom of the electrode assembly.

4. The cylindrical secondary battery according to claim 3, wherein the positive electrode current collector plate includes one or more strips extending along a radial direction of the electrode assembly from a center of the positive electrode current collector plate, the one or more positive electrode welding portions being located on the one or more strips of the positive electrode current collector plate, and
wherein the negative electrode current collector plate includes one or more strips extending along the radial direction of the electrode assembly from a center of the negative electrode current collector plate, and the one or more negative electrode welding portions are located on the one or more strips of the negative electrode current collector plate.

5. The cylindrical secondary battery according to claim 4, wherein the one or more strips of the positive electrode current collector plate includes two or more strips arranged at equal intervals, and
wherein the one or more strips of the negative electrode current collector plate includes two or more strips arranged at equal intervals.

6. The cylindrical secondary battery according to claim 4, wherein a number of the strips of the negative electrode current collector plate is M, and a number of the strips of the positive electrode current collector plate is 1 to M−1 (M is a natural number equal to or greater than 2).

7. The cylindrical secondary battery according to claim 4, wherein a number of the positive electrode welding portions is smaller than a number of the negative electrode welding portions.

8. The cylindrical secondary battery according to claim 1, wherein a number of the positive electrode welding portions is equal to a number of the negative electrode welding portions, and
wherein an area of one positive electrode welding portion of the one or more positive electrode welding portions is smaller than an area of one negative electrode welding portion of the one or more negative electrode welding portions.

9. The cylindrical secondary battery according to claim 8, wherein the one or more positive electrode welding portions and the one or more negative electrode welding portions extend along a radial direction of the electrode assembly.

10. The cylindrical secondary battery according to claim 3, wherein the positive electrode current collector plate and the negative electrode current collector plate have a same outline shape as a top and bottom of the electrode assembly, respectively.

11. The cylindrical secondary battery according to claim 1, further comprising:
a battery can configured to accommodate the electrode assembly therein, the battery can including an open portion and a partially closed portion opposite the open portion, the battery can being electrically connected to the negative electrode uncoated portion;
a cap plate configured to seal the open portion of the battery can; and
a rivet terminal at a center of the partially closed portion, the rivet being electrically connected to the positive electrode uncoated portion.

12. The cylindrical secondary battery according to claim 11, wherein the cap plate is not connected to the electrode assembly so as to have no polarity.

13. The cylindrical secondary battery according to claim 11, wherein the positive electrode current collector plate includes:
a rim portion;
one or more positive electrode tab coupling portions configured to extend inward from the rim portion, the one or more positive electrode tab coupling portion being coupled to the positive electrode uncoated portion by the one or more positive electrode welding portions; and
a terminal coupling portion spaced apart from the one or more positive electrode tab coupling portions, and
wherein the rivet terminal is coupled to the terminal coupling portion.

14. The cylindrical secondary battery according to claim 13, wherein the rim portion defines a partially empty space.

15. The cylindrical secondary battery according to claim 13, wherein the one or more positive electrode tab coupling portions and the terminal coupling portion are electrically connected by the rim portion.

16. The cylindrical secondary battery according to claim 13, wherein the terminal coupling portion is located in a center portion of an inner space of the rim portion.

17. The cylindrical secondary battery according to claim 13, wherein the one or more positive electrode tab coupling portions includes a plurality of the positive electrode tab coupling portions.

18. The cylindrical secondary battery according to claim 17, wherein the plurality of positive electrode tab coupling portions are arranged at equal intervals along a circumferential direction of the rim.

19. The cylindrical secondary battery according to claim 17, wherein each of the plurality of positive electrode tab coupling portions has a same extended length.

20. The cylindrical secondary battery according to claim 17, wherein the terminal coupling portion is disposed to be surrounded by the plurality of positive electrode tab coupling portions.

21. The cylindrical secondary battery according to claim 13, wherein the electrode assembly includes a cavity in a winding center portion thereof, and the terminal coupling portion is disposed at a location corresponding to the cavity.

22. The cylindrical secondary battery according to claim 13, wherein the battery can includes a beading part at an end adjacent to the open portion, and
wherein the negative electrode current collector plate includes:
one or more negative electrode tab coupling portions coupled to the negative electrode uncoated portion by the one or more negative electrode welding portions; and
one or more can coupling portions electrically coupled to the beading part.

23. The cylindrical secondary battery according to claim 22, wherein the one or more can coupling portions extend from the one or more negative electrode tab coupling portions.

24. The cylindrical secondary battery according to claim 22, wherein the one or more negative electrode tab coupling portions and the one or more can coupling portions are indirectly connected by a center portion of the negative electrode current collector plate and are not directly connected to each other.

25. The cylindrical secondary battery according to claim 22, wherein each of the negative electrode tab coupling portions has at least one injection hole.

26. The cylindrical secondary battery according to claim 22, wherein the negative electrode current collector plate includes a circular negative electrode current collector plate hole in a center portion of the negative electrode current collector plate.

27. The cylindrical secondary battery according to claim 26, wherein the electrode assembly includes a cavity in a winding center portion thereof, and a diameter of the negative electrode current collector plate hole is equal to or greater than a diameter of the cavity.

28. The cylindrical secondary battery according to claim 22, wherein the negative electrode current collector plate has one or more leg structures, each leg structure having one of the one or more negative electrode tab coupling portions and one of the one or more can coupling portions connected to each other, each leg structure extending along a radial direction of the electrode assembly.

29. The cylindrical secondary battery according to claim 28, wherein the one or more leg structures include a plurality of the leg structures.

30. The cylindrical secondary battery according to claim 22, wherein each of the one or more positive electrode tab coupling portions includes one of the one or more positive electrode welding portions,
wherein each of the one or more negative electrode tab coupling portions includes one of the one or more negative electrode welding portions, and
wherein a number of the positive electrode tab coupling portions is smaller than a number of the negative electrode tab coupling portions.

31. The cylindrical secondary battery according to claim 30, wherein the number of the negative electrode tab coupling portions is M, and the number of the positive electrode tab coupling portions is 1 to M−1 (M is a natural number equal to or greater than 2).

32. The cylindrical secondary battery according to claim 30, wherein the one or more positive electrode welding portions and the one or more negative electrode welding portions extend along a radial direction of the electrode assembly.

33. The cylindrical secondary battery according to claim 22, wherein each of the one or more positive electrode tab coupling portions includes one of the one or more positive electrode welding portions,
wherein each of the one or more negative electrode tab coupling portions includes one of the one or more negative electrode welding portions,
wherein a number of the positive electrode welding portions is equal to a number of the negative electrode welding portions, and
wherein an area of one positive electrode welding portion of the one or more positive electrode welding portions is smaller than an area of one negative electrode welding portion of the one or more negative electrode welding portions.

34. A battery pack, comprising the cylindrical secondary battery according to claim 1.

35. A vehicle, comprising the battery pack according to claim 34.

* * * * *